United States Patent
Ito et al.

(10) Patent No.: US 12,530,946 B2
(45) Date of Patent: Jan. 20, 2026

(54) CONTROL DEVICE THAT PROVIDES TACTILE STIMULUS

(71) Applicant: SONY GROUP CORPORATION, Tokyo (JP)

(72) Inventors: Osamu Ito, Tokyo (JP); Ikuo Yamano, Tokyo (JP); Takuro Noda, Tokyo (JP); Ryo Yokoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 205 days.

(21) Appl. No.: 18/263,353

(22) PCT Filed: Jan. 12, 2022

(86) PCT No.: PCT/JP2022/000743
§ 371 (c)(1),
(2) Date: Jul. 28, 2023

(87) PCT Pub. No.: WO2022/168547
PCT Pub. Date: Aug. 11, 2022

(65) Prior Publication Data
US 2024/0304068 A1    Sep. 12, 2024

(30) Foreign Application Priority Data
Feb. 8, 2021   (JP) .................... 2021-018531

(51) Int. Cl.
*G06F 3/01*       (2006.01)
*G08B 7/00*       (2006.01)
(Continued)

(52) U.S. Cl.
CPC .............. *G08B 7/00* (2013.01); *G06F 3/016* (2013.01); *H04R 3/12* (2013.01); *A63F 13/285* (2014.09); *H04R 2420/07* (2013.01)

(58) Field of Classification Search
CPC ...... H04R 3/12; H04R 2420/07; H04R 5/023; H04R 1/1008; H04R 1/1091;
(Continued)

(56) References Cited

U.S. PATENT DOCUMENTS 9,842,476 B2 *  12/2017  Rihn ....................... G06F 3/167
10,150,029 B2 * 12/2018  Yamano ................. G06F 1/266
(Continued)

FOREIGN PATENT DOCUMENTS

JP       2006-163579 A      6/2006
JP       2013-524315 A      6/2013
(Continued)

OTHER PUBLICATIONS

International Search Report and Written Opinion of PCT Application No. PCT/JP2022/000743, issued on Mar. 22, 2022, 09 pages of ISRWO.

*Primary Examiner* — Disler Paul
(74) *Attorney, Agent, or Firm* — CHIP LAW GROUP

(57) ABSTRACT

A control device includes a reproduction unit that causes stereo speakers of an aural-tactile presentation device to output sound on the basis of sound data and causes tactile presentation units provided corresponding to the respective stereo speakers in the aural-tactile presentation device to provide a tactile stimulus on the basis of tactile data, and a switching control unit that switches, on the basis of content information of content data including at least the sound data, the tactile data to be input to the tactile presentation units to either the tactile data generated by a tactile data generation unit on the basis of the sound data or the tactile data included in the content data.

10 Claims, 16 Drawing Sheets

(51) Int. Cl.
*H04R 3/12* (2006.01)
*A63F 13/285* (2014.01)

(58) Field of Classification Search
CPC ...... A63F 13/285; A63F 13/214; A63F 13/54;
A63F 13/28; G06F 3/016
USPC ........................................ 381/77–80, 74, 62
See application file for complete search history.

(56) References Cited

U.S. PATENT DOCUMENTS

| | | | |
|---|---|---|---|
| 10,347,093 B2 * | 7/2019 | Rihn | G08B 6/00 |
| 10,741,189 B2 * | 8/2020 | Lacroix | G10L 19/008 |
| 10,828,562 B2 * | 11/2020 | Yamano | G06F 3/16 |
| 12,220,251 B2 * | 2/2025 | Snow | A61H 23/0218 |

FOREIGN PATENT DOCUMENTS

| | | |
|---|---|---|
| JP | 2015-053054 A | 3/2015 |
| JP | 2019-219785 A | 12/2019 |
| WO | 2020/008931 A1 | 1/2020 |
| WO | 2020/137767 A1 | 7/2020 |

* cited by examiner

FIG. 2
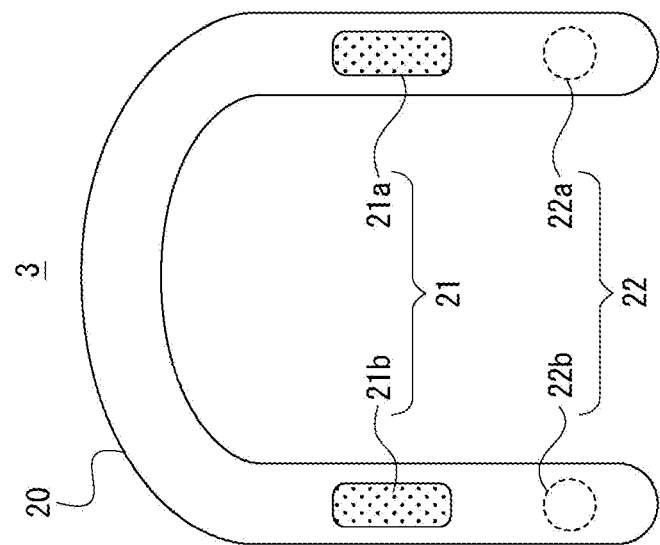
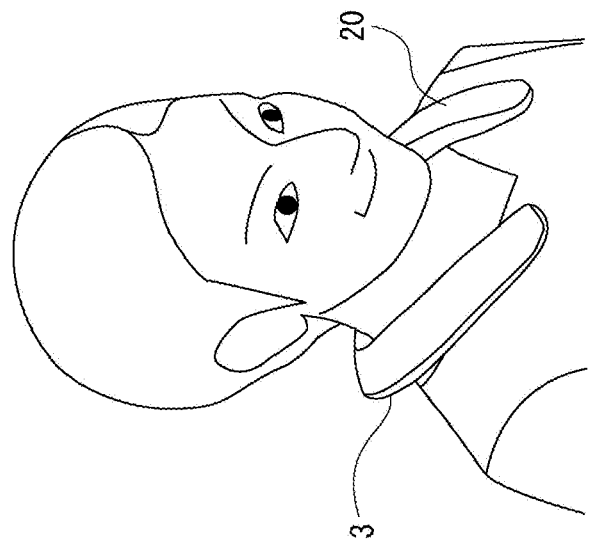

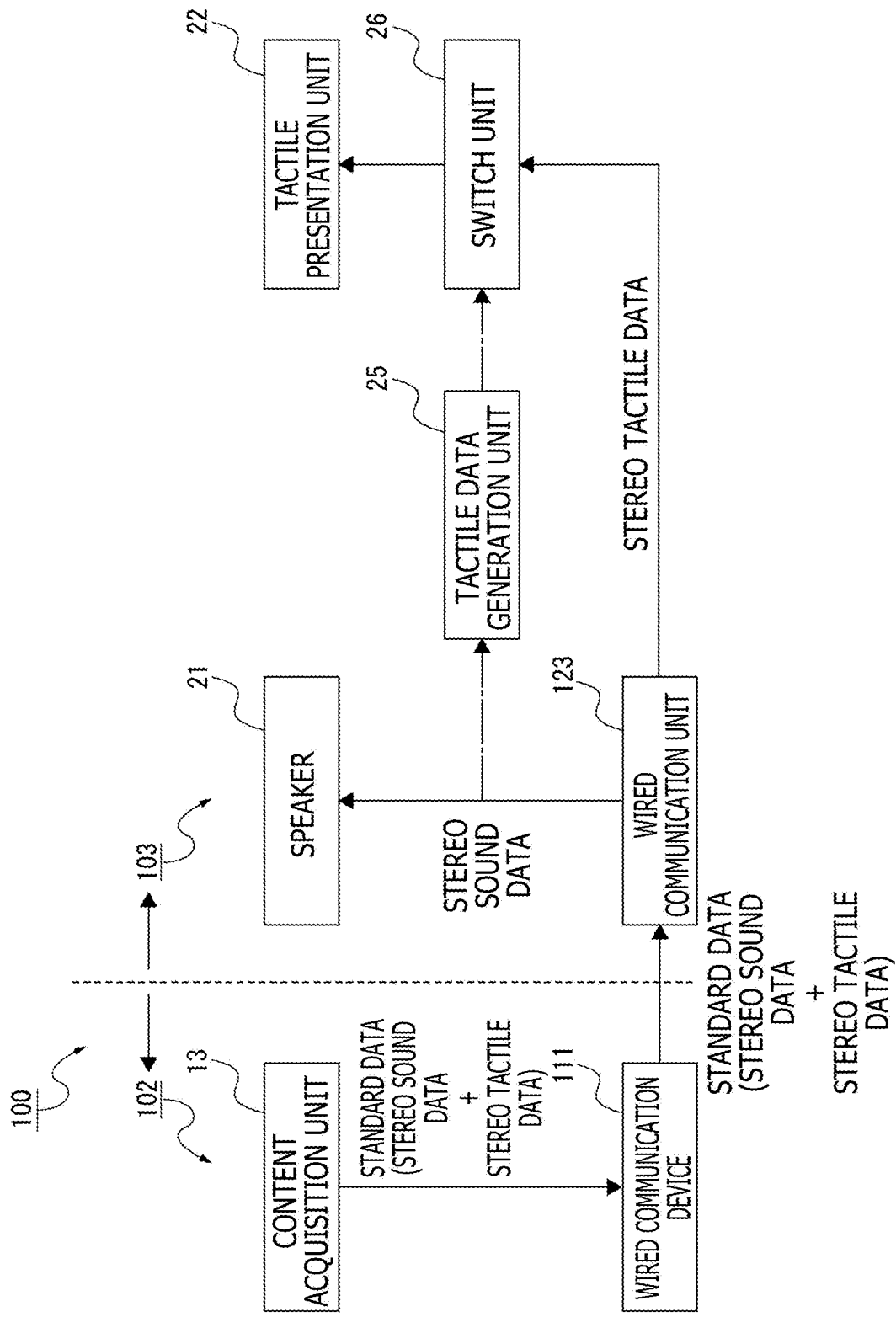

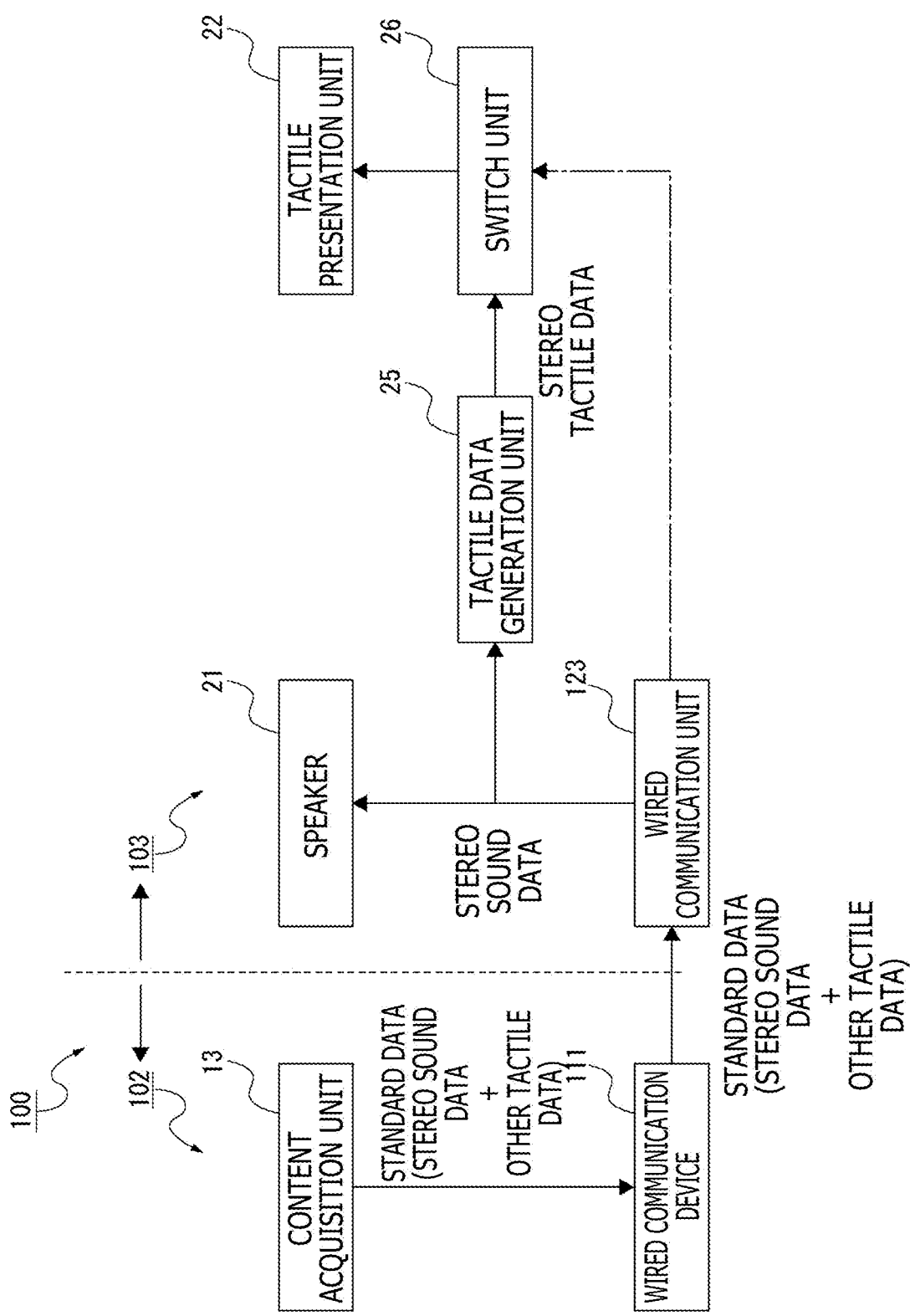

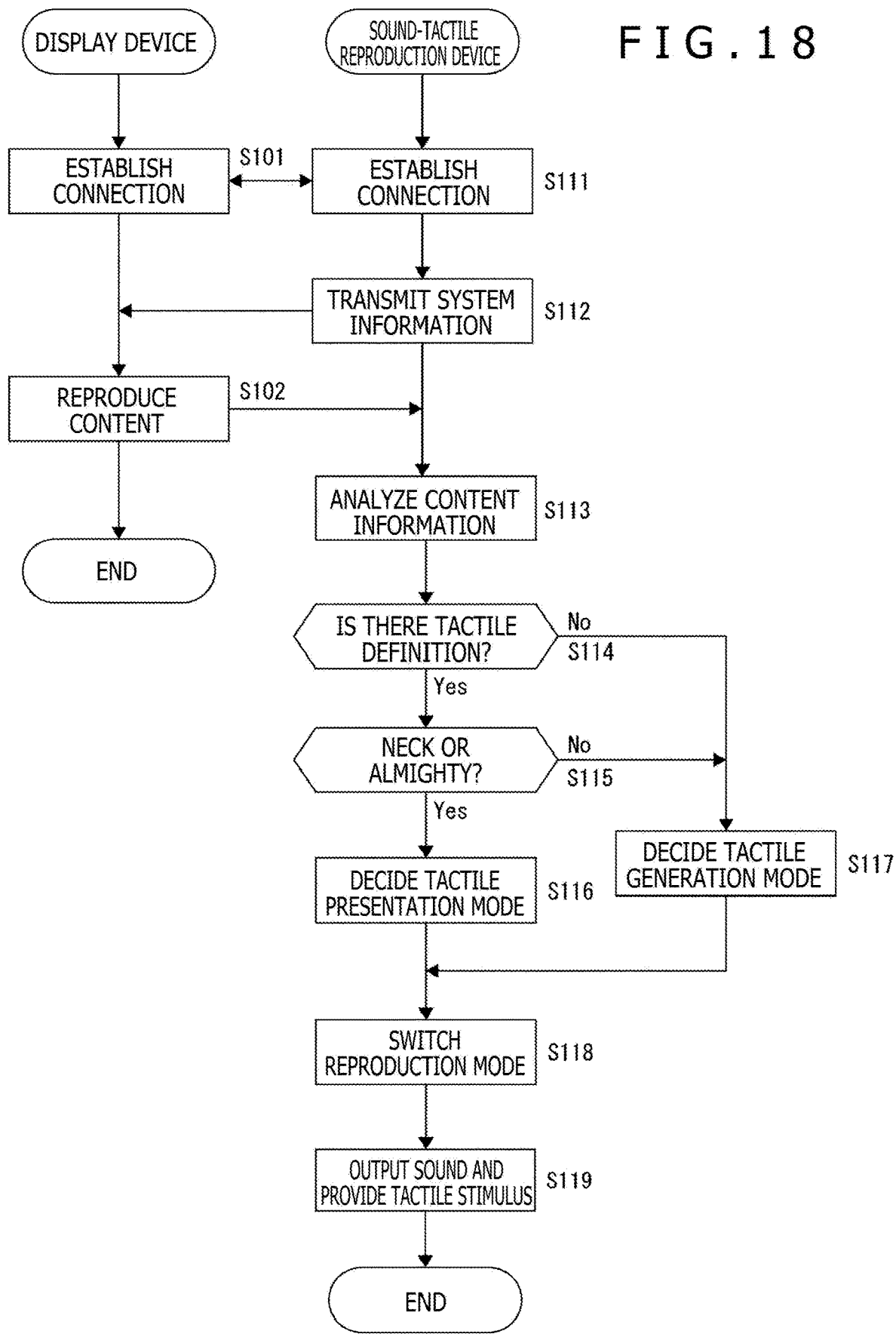

CONTROL DEVICE THAT PROVIDES TACTILE STIMULUS

CROSS REFERENCE TO RELATED APPLICATIONS

This application is a U.S. National Phase of International Patent Application No. PCT/JP2022/000743 filed on Jan. 12, 2022, which claims priority benefit of Japanese Patent Application No. JP 2021-018531 filed in the Japan Patent Office on Feb. 8, 2021. Each of the above-referenced applications is hereby incorporated herein by reference in its entirety.

TECHNICAL FIELD

The present technique relates to a control device and a control method, and particularly to a technique for providing a tactile stimulus to a user.

BACKGROUND ART

In recent years, a technique for providing a tactile stimulus to a user by vibrating a device worn by the user has been developed. Here, the tactile stimulus means a physical phenomenon that causes the user to feel a tactile sense by vibrations or the like. In addition, generating a tactile stimulus is referred to as tactile presentation.

The technique of the tactile presentation is used in equipment in various fields.

For example, in a terminal device including a touch panel such as a smartphone, the touch panel or a housing vibrates according to a touch operation from the user, and a tactile stimulus is provided to a finger or fingers of the user, thereby enabling a feeling of touch to a button or the like displayed on the touch panel to be expressed.

In addition, for example, in a music listening device such as headphones, it is possible to emphasize deep bass in the music being reproduced, by providing a tactile stimulus along with music reproduction.

In addition, for example, in a device that provides a computer game, VR (Virtual Reality), and the like, it is possible to improve the immersion feeling of the user to content by reproducing sound and vibrating a controller or the like to provide a tactile stimulus according to an operation using the controller or a scene of the content.

As such a device for the tactile presentation to the user, a device in which multiple actuators are arranged at intervals inside a body part formed roughly in a C-shape has been proposed. The device is designed to vibrate the multiple actuators in a predetermined pattern after the body part is attached to the neck of the user, such that a tactile stimulus according to the pattern is provided to the user.

CITATION LIST

Patent Literature

[PTL 1]
JP-T-2013-524315

SUMMARY

Technical Problem

In the meantime, other than content including, for example, a video and sound, content in various formats, such as content that causes a tactile stimulus to be generated in addition to a video and sound, has been provided in recent years. Hence, it has been desired to provide a tactile stimulus suitable for each content to a user in a device for the tactile presentation.

Therefore, an object of the present technique is to provide a tactile stimulus suitable for each content to a user.

Solution to Problem

A control device according to the present technique includes a reproduction unit that causes stereo speakers of an aural-tactile presentation device to output sound on the basis of sound data and causes tactile presentation units provided corresponding to the respective stereo speakers in the aural-tactile presentation device to provide a tactile stimulus on the basis of tactile data, and a switching control unit that switches, on the basis of content information of content data including at least the sound data, the tactile data to be input to the tactile presentation units to either the tactile data generated by a tactile data generation unit on the basis of the sound data or the tactile data included in the content data.

Accordingly, it is possible to switch the tactile data to be input to the tactile presentation units, according to the content data.

In the control device according to the present technique described above, it is desirable that the switching control unit perform switching on the basis of the content information and system configuration information of the aural-tactile presentation device.

Accordingly, it is possible to switch the tactile data to be input to the tactile presentation units, according to the content and the system configuration of the aural-tactile presentation device.

In the control device according to the present technique described above, it is desirable that the sound data and the tactile data be transmitted by wireless communication in the aural-tactile presentation device, and the system configuration information include information related to a communication method used by the wireless communication.

Accordingly, it is possible to switch the tactile data to be input to the tactile presentation units, according to the communication method of the wireless communication.

In the control device according to the present technique described above, it is desirable that the system configuration information include information related to the numbers of pieces of the sound data and the tactile data that can be transmitted by the wireless communication.

Accordingly, it is possible to switch the tactile data to be input to the tactile presentation units, according to the numbers of pieces of sound data and tactile data.

In the control device according to the present technique described above, it is desirable that the content information include information related to data configurations of the sound data and the tactile data.

Accordingly, it is possible to switch the tactile data to be input to the tactile presentation units, according to the data configurations of the sound data and the tactile data.

In the control device according to the present technique described above, it is desirable that, in a case where the content data does not include the tactile data, the switching control unit cause the tactile presentation units to provide a tactile stimulus on the basis of the tactile data generated by the tactile data generation unit.

Accordingly, it is possible to provide a tactile stimulus from the tactile presentation units on the basis of the tactile data generated by the tactile data generation unit even in the case where the content data does not include the tactile data.

In the control device according to the present technique described above, it is desirable that, in a case where the content data includes the tactile data, the switching control unit cause the tactile presentation units to provide a tactile stimulus on the basis of the tactile data included in the content data.

Accordingly, it is possible to provide a tactile stimulus from the tactile presentation units on the basis of the tactile data included in the content data in the case where the content data includes the tactile data.

In the control device according to the present technique described above, it is desirable that, in the case where the content data includes the tactile data, the switching control unit do not cause the tactile data generation unit to generate the tactile data.

Accordingly, it is possible to reduce power consumption by not causing the tactile data generation unit to generate the tactile data in the case where the content data includes the tactile data.

In the control device according to the present technique described above, it is desirable that regions to which a tactile stimulus is to be provided be associated with the tactile data, and in a case where the tactile data of regions corresponding to the tactile presentation units is included in the content data, the switching control unit cause the tactile presentation units to provide a tactile stimulus on the basis of the tactile data included in the content data.

Accordingly, it is possible to provide a tactile stimulus from the tactile presentation units on the basis of the tactile data of the regions corresponding to the tactile presentation units.

In the control device according to the present technique described above, it is desirable that regions to which a tactile stimulus is to be provided be associated with the tactile data, and in a case where the tactile data of regions corresponding to the tactile presentation units is not included in the content data, the switching control unit cause the tactile presentation units to provide a tactile stimulus on the basis of the tactile data generated by the tactile data generation unit.

Accordingly, it is possible to prevent a tactile stimulus from being provided from the tactile presentation units on the basis of the tactile data of positions that do not correspond to the tactile presentation units.

In the control device according to the present technique described above, it is desirable that regions to which a tactile stimulus is to be provided be associated with the tactile data, and in a case where the tactile data of a region other than regions corresponding to the tactile presentation units is included in the content data, the switching control unit cause the tactile presentation units to provide a tactile stimulus on the basis of the tactile data generated by the tactile data generation unit.

Accordingly, it is possible to prevent a tactile stimulus from being provided from the tactile presentation units on the basis of the tactile data of positions that do not correspond to the tactile presentation units.

In addition, a control device according to the present technique includes causing stereo speakers of an aural-tactile presentation device to output sound on the basis of sound data and causing tactile presentation units provided corresponding to the respective stereo speakers in the aural-tactile presentation device to provide a tactile stimulus on the basis of tactile data, and switching, on the basis of content information of content data including at least the sound data, the tactile data to be input to the tactile presentation units to either the tactile data generated by a tactile data generation unit on the basis of the sound data or the tactile data included in the content data.

Actions similar to those of the control device according to the present technique described above can be obtained even by such a control method.

BRIEF DESCRIPTION OF DRAWINGS

FIG. 2 is a diagram for explaining an example of a structure of an aural-tactile presentation device.

FIG. 16 is a first diagram for explaining control in a case where sound data and tactile data are included in the standard data.

FIG. 17 is a second diagram for explaining control in the case where the sound data and the tactile data are included in the standard data.

FIG. 18 is a sequence chart for depicting a flow of processing of a content reproduction system in the second embodiment.

DESCRIPTION OF EMBODIMENTS

Hereinafter, embodiments will be described in the following order.
<1. First Embodiment>
 [1-1. Outline configuration of content reproduction system]
 [1-2. Circuit configuration of content reproduction system]
 [1-3. Specific example of reproduction mode switching]
 [1-4. Processing of content reproduction system]
<2. Second Embodiment>
 [2-1. Circuit configuration of content reproduction system]

[2-2. Specific example of reproduction mode switching]
[2-3. Processing of content reproduction system]
<3. Modified Example>
<4. Summary>
<5. Present Technique>

1. First Embodiment

[1-1. Outline Configuration of Content Reproduction System]

Figure 1:
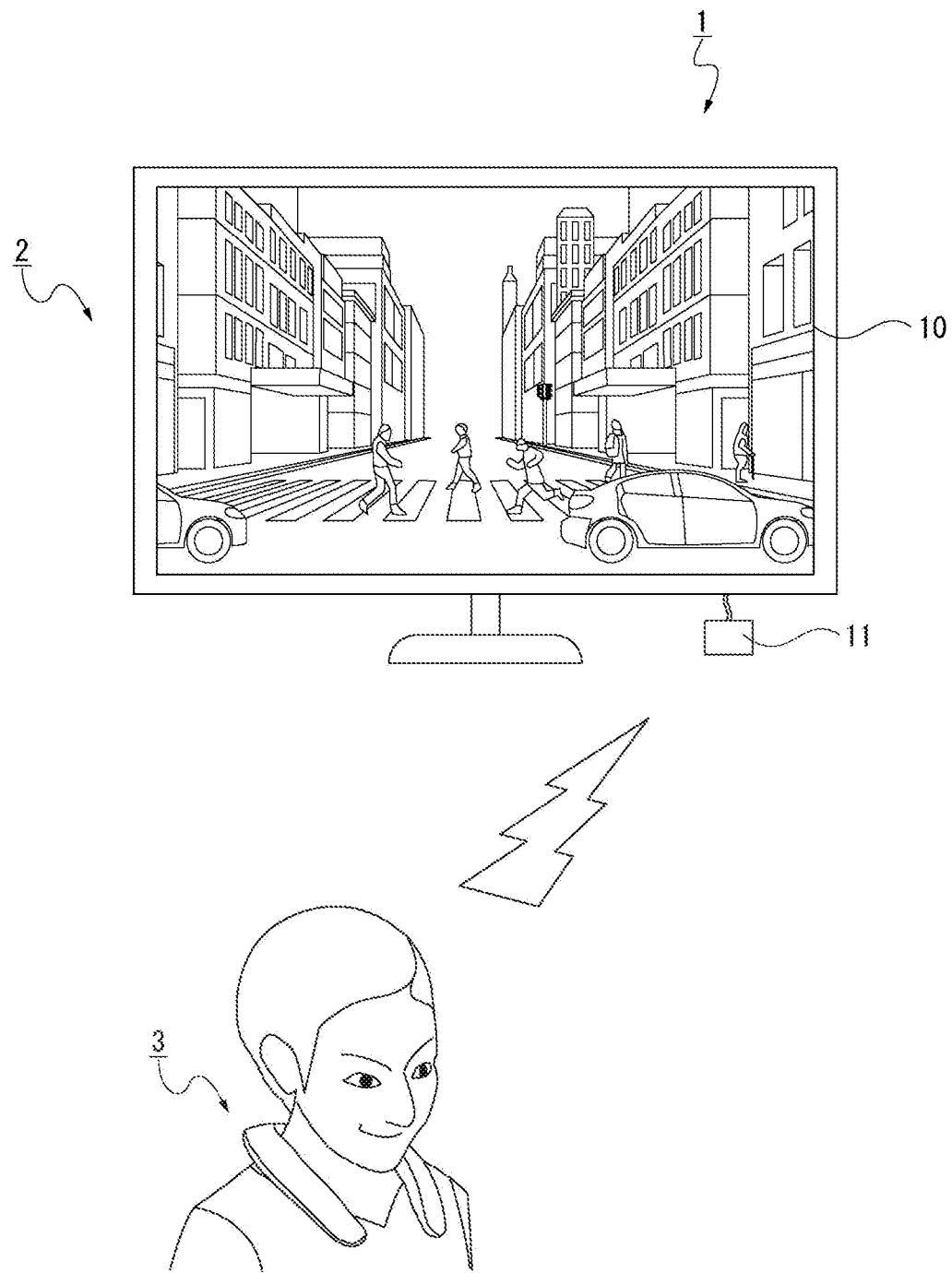
FIG. 1 is a schematic diagram of a content reproduction system of a first embodiment.

FIG. 1 is a schematic diagram of a content reproduction system 1 of a first embodiment. As depicted in FIG. 1, the content reproduction system 1 is a system that provides content including a video, sound, and a tactile stimulus to a user, and includes a video reproduction device 2 and an aural-tactile presentation device 3.

The video reproduction device 2 includes a television device 10 and a wireless communication device 11. The video reproduction device 2 is one embodiment of a control device according to the present technique. The television device 10 acquires content data including at least any of video data, sound data, or tactile data. In addition, the television device 10 displays a video as a visual stimulus on a display unit 15 (see FIG. 3) on the basis of the video data included in the acquired content data.

The television device 10 is capable of communicating with the aural-tactile presentation device 3 via the wireless communication device 11 and transmits part or all of the content data to the aural-tactile presentation device 3. The wireless communication device 11 performs, for example, short-range wireless communication by a communication method such as Bluetooth (registered trademark). It should be noted that, although the television device 10 and the wireless communication device 11 are separately provided in the video reproduction device 2, the television device 10 and the wireless communication device 11 may integrally be provided.

The aural-tactile presentation device 3 is, for example, a wearable device that is driven by a battery, and is more specifically active vibrating headphones, an active vibrating wearable speaker, or the like. On the basis of the content data transmitted from the video reproduction device 2, the aural-tactile presentation device 3 outputs sound as an auditory stimulus and provides vibration to the user as a tactile stimulus.

FIG. 2 is a diagram for explaining an example of a structure of the aural-tactile presentation device 3. As depicted in FIG. 2, the aural-tactile presentation device 3 is used in such a manner that a housing 20 formed in a substantially U-shape is hung on the shoulders as illustrated in the drawing.

Speakers 21 are provided at both tip ends (left and right) of the housing 20, and tactile presentation units 22 are provided at positions corresponding to the speakers 21.

The speakers 21 are stereo speakers including a right speaker 21a provided at one end (the right side when worn by the user) of the housing 20 and a left speaker 21b provided at the other end (the left side when worn by the user) of the housing 20.

It should be noted that a digital analog converter and an amplifier, which are not illustrated, are connected to the speakers 21. The digital analog converter converts digital sound data into an analog sound signal, and the amplifier amplifies the converted sound signal and outputs the signal to the speakers 21.

The tactile presentation units 22 provide a tactile stimulus near the collarbones of the user, for example, when a vibrator vibrates. The tactile presentation units 22 are stereo tactile presentation units including a right tactile presentation unit 22a provided at one end of the housing 20 and a left tactile presentation unit 22b provided at the other end of the housing 20. The right tactile presentation unit 22a is provided at a position corresponding to the right speaker 21a, and the left tactile presentation unit 22b is provided at a position corresponding to the left speaker 21b.

It should be noted that the digital analog converter and the amplifier, which are not illustrated, are connected to the tactile presentation units 22. The digital analog converter converts digital tactile data into an analog tactile signal, and the amplifier amplifies the converted tactile signal and outputs the signal to the tactile presentation units 22.

[1-2. Circuit Configuration of Content Reproduction System]

Figure 3:
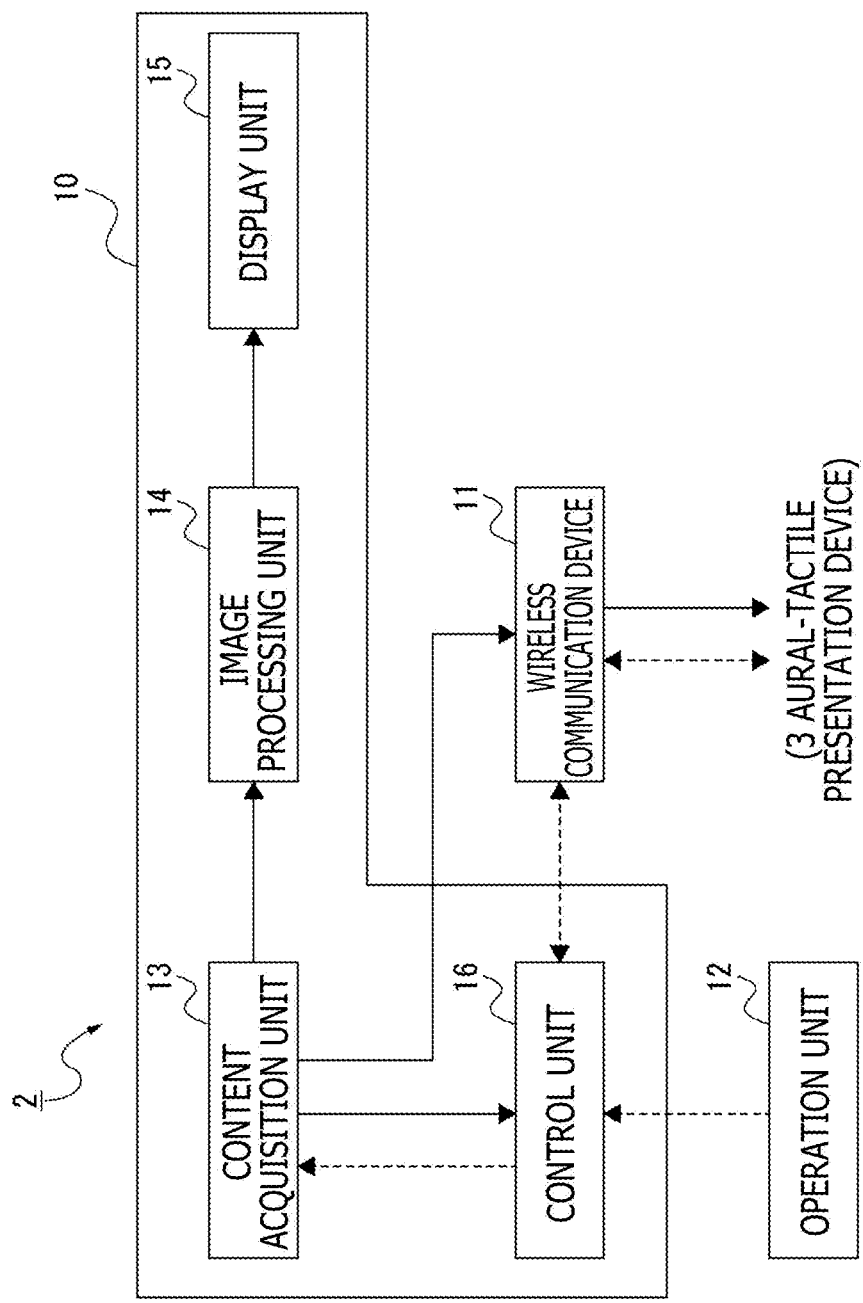
FIG. 3 is a block diagram of a video reproduction device of the first embodiment.

FIG. 3 is a block diagram of the video reproduction device 2 of the first embodiment. It should be noted that, in FIG. 3, a flow of all or part of the content data is indicated by solid arrows, and a flow of signals for performing control is indicated by dashed arrows.

As depicted in FIG. 3, the video reproduction device 2 includes an operation unit 12 in addition to the television device 10 and the wireless communication device 11. The operation unit 12 is, for example, a device that accepts a user operation on a remote controller, a touch panel, or the like. The television device 10 receives a signal according to the user operation from the operation unit 12 and acquires content data of content indicated by the received signal. That is, the television device 10 acquires content data of content selected by the user operation on the operation unit 12.

The television device 10 includes a content acquisition unit 13, an image processing unit 14, the display unit 15, and a control unit 16.

The content acquisition unit 13 includes a receiver for receiving television broadcasting and is capable of receiving content data of the television broadcasting by the receiver. In addition, the content acquisition unit 13 may be capable of receiving content data from an external device via a network such as the Internet, a home network, a LAN (Local Area Network), or a satellite communication network.

The content data includes at least any data of video data, sound data, or tactile data. In the example, at least video data and sound data are included in the content data, and there are cases where tactile data is included and not included.

The image processing unit 14 includes, for example, a DSP (Digital Signal Processor). The image processing unit 14 performs predetermined image processing on the video data included in the content data acquired by the content acquisition unit 13.

The display unit 15 includes, for example, a liquid crystal display, an organic EL display, or the like and displays a video based on the video data subjected to image processing by the image processing unit 14.

The control unit 16 includes a microcomputer having, for example, a CPU (Central Processing Unit), a ROM (Read Only Memory), a RAM (Random Access Memory), and the like and performs overall control of the video reproduction device 2 by executing processing according to a program stored in the ROM. In addition, the control unit 16 performs wireless communication with the aural-tactile presentation device 3 via the wireless communication device 11.

Figure 4:
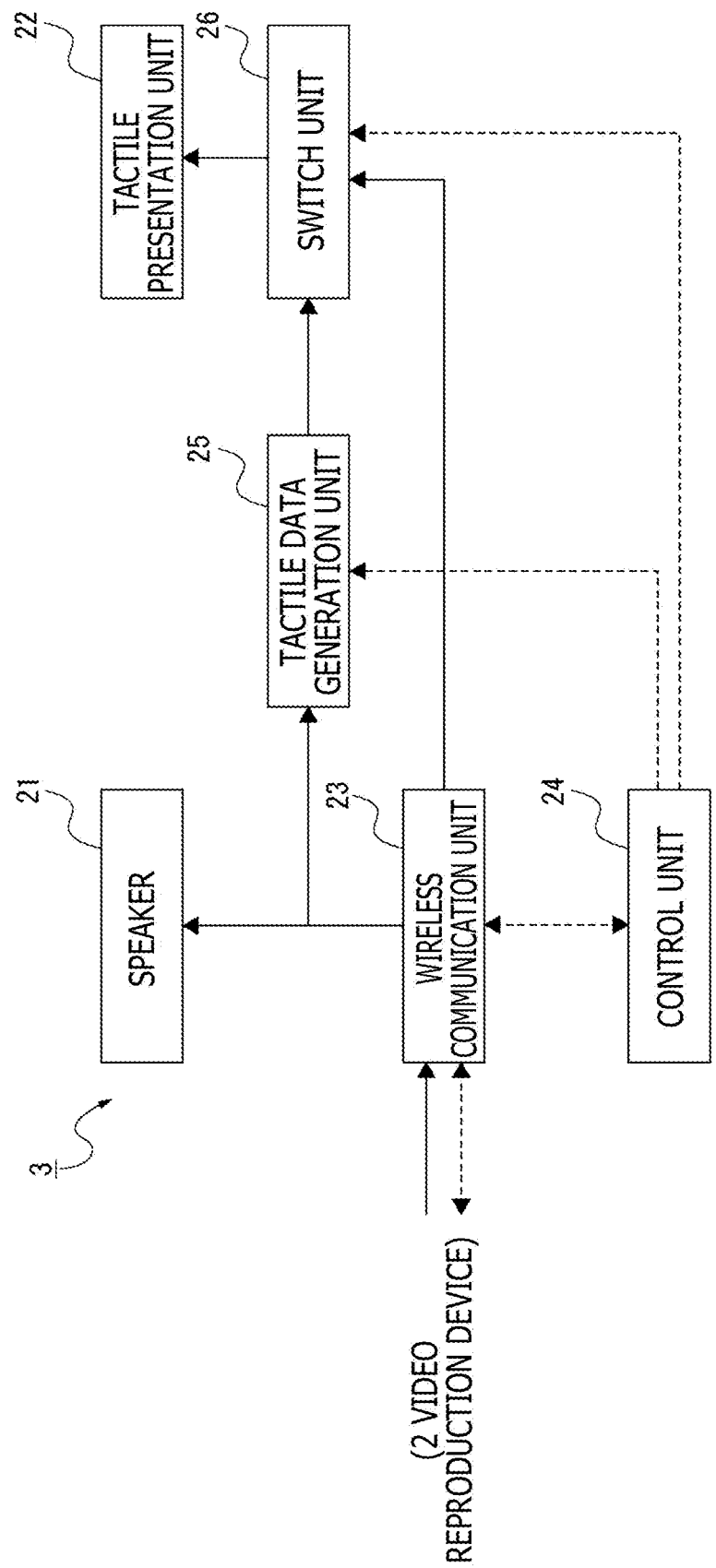
FIG. 4 is a block diagram of the aural-tactile presentation device of the first embodiment.

FIG. 4 is a block diagram of the aural-tactile presentation device 3 of the first embodiment. It should be noted that, in FIG. 4, a flow of all or part of the content data is indicated by solid arrows, and a flow of signals for performing control is indicated by dashed arrows.

As depicted in FIG. 4, the aural-tactile presentation device 3 includes the speakers 21, the tactile presentation units 22, a wireless communication unit 23, a control unit 24, a tactile data generation unit 25, and a switch unit 26.

The wireless communication unit 23 performs, for example, short-range wireless communication with the wireless communication device 11 by a communication method such as Bluetooth.

The control unit 24 includes a microcomputer having, for example, a CPU, a ROM, a RAM, and the like and performs overall control of the aural-tactile presentation device 3 by executing processing according to a program stored in the ROM. In addition, the control unit 24 performs wireless communication with the video reproduction device 2 via the wireless communication unit 23.

The tactile data generation unit 25 includes, for example, a DSP. The tactile data generation unit 25 generates tactile data by applying predetermined processing to the sound data included in the content data, such as extracting, for example, data of a low-frequency band in the sound data as tactile data. It should be noted that a well-known method can be used for the method of generating the tactile data on the basis of the sound data, and the explanation is omitted here. For example, the method described in PCT Patent Publication No. WO2020/008931A1 can be applied.

The switch unit 26 includes a switch circuit having two input terminals and one output terminal. The wireless communication unit 23 and the tactile data generation unit 25 are connected to the respective input terminals of the switch unit 26, and the tactile presentation units 22 are connected to the output terminal. In addition, a control signal is input to the switch unit 26 from the control unit 24.

On the basis of the control signal input from the control unit 24, the switch unit 26 performs switching between connecting one of the input terminals to the output terminal and not connecting the output terminal to any of the input terminals. That is, the switch unit 26 performs switching between causing the tactile data included in the content data acquired by the content acquisition unit 13 to be input to the tactile presentation units 22, causing the tactile data generated by the tactile data generation unit 25 to be input to the tactile presentation units 22, and causing any tactile data not to be input to the tactile presentation units 22.

Figure 5:
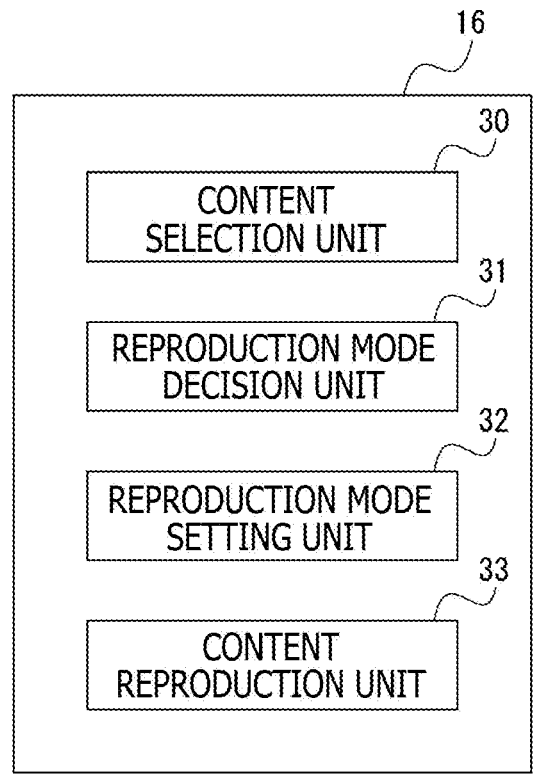
FIG. 5 is a block diagram for explaining a functional configuration of a control unit of the first embodiment.

FIG. 5 is a block diagram for explaining a functional configuration of the control unit 16 of the first embodiment. As depicted in FIG. 5, the control unit 16 in the first embodiment functions as a content selection unit 30, a reproduction mode decision unit 31, a reproduction mode setting unit 32, and a content reproduction unit 33. It should be noted that the control unit 16 may have function units functioning as units other than the content selection unit 30, the reproduction mode decision unit 31, the reproduction mode setting unit 32, and the content reproduction unit 33.

In a case where new content is selected by a user operation on the operation unit 12, the content selection unit 30 sets the selected new content as content to be acquired.

When wireless communication is established with the aural-tactile presentation device 3 via the wireless communication device 11, the reproduction mode decision unit 31 receives (acquires) system configuration information from the aural-tactile presentation device 3. In addition, the reproduction mode decision unit 31 acquires content information of the content data acquired by the content acquisition unit 13.

It should be noted that the system configuration information is information related to a configuration of the aural-tactile presentation device 3. The system configuration information includes configuration information of the aural-tactile presentation device 3, information related to a communication method (the number of pieces of data that can be transmitted) of the wireless communication, and the like. The configuration information of the aural-tactile presentation device 3 includes information such as the number and arrangement positions of the speakers 21 and the number and arrangement positions of the tactile presentation units 22.

In addition, the content information is information (information indicating what kind of data is included) related to the data configuration of the content data.

The reproduction mode decision unit 31 decides a reproduction mode of the content data in the aural-tactile presentation device 3 on the basis of the acquired system configuration information and content information. It should be noted that the reproduction mode specifies the sound data to be output to the speakers 21 and the tactile data to be input to the tactile presentation units 22. More specifically, the reproduction mode specifies whether the tactile data to be input to the tactile presentation units 22 is set to either the tactile data generated by the tactile data generation unit 25 or the tactile data included in the content data.

The reproduction mode setting unit 32 transmits the information indicating the reproduction mode decided by the reproduction mode decision unit 31 to the aural-tactile presentation device 3. That is, the reproduction mode decision unit 31 and the reproduction mode setting unit 32 cause the tactile data, which is to be input to the tactile presentation units 22, to be switched to either the tactile data generated by the tactile data generation unit 25 or the tactile data included in the content data. The reproduction mode decision unit 31 and the reproduction mode setting unit 32 are one embodiment of a switching control unit according to the present technique.

After the lapse of a predetermined lapse time from the time when content to be acquired is newly set by the content selection unit 30, the content reproduction unit 33 causes the content acquisition unit 13 to start acquiring content data of the newly set content to be acquired. Here, the lapse time is set longer than the time required to complete the setting process of the reproduction mode in the aural-tactile presentation device 3.

In addition, the content reproduction unit 33 causes the display unit 15 to display a video based on the video data included in the content data acquired by the content acquisition unit 13, and transmits the sound data and the tactile data included in the content data to the aural-tactile presentation device 3 via the wireless communication device 11. Accordingly, in the aural-tactile presentation device 3, sound is output from the speakers 21, and a tactile stimulus is provided from the tactile presentation units 22. The content reproduction unit 33 is one embodiment of a reproduction unit according to the present technique.

Figure 6:
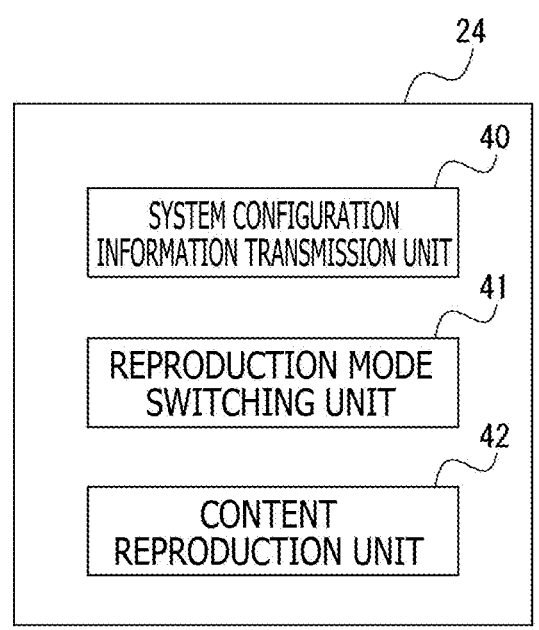
FIG. 6 is a block diagram for explaining a functional configuration of a control unit of the first embodiment.

FIG. 6 is a block diagram for explaining a functional configuration of the control unit 24 of the first embodiment. As depicted in FIG. 6, the control unit 24 functions as a system configuration information transmission unit 40, a reproduction mode switching unit 41, and a content reproduction unit 42. It should be noted that the control unit 24 may have function units functioning as units other than the system configuration information transmission unit 40, the reproduction mode switching unit 41, and the content reproduction unit 42.

When wireless communication is established with the video reproduction device 2 via the wireless communication unit 23, the system configuration information transmission unit 40 transmits the system configuration information of the aural-tactile presentation device 3 to the video reproduction device 2.

The reproduction mode switching unit 41 controls the tactile data generation unit 25 and the switch unit 26 on the basis of information indicating the reproduction mode transmitted by the reproduction mode setting unit 32. It should be noted that the control by the reproduction mode switching unit 41 will be described later in detail.

The content reproduction unit 42 causes the speakers 21 to output sound based on the sound data transmitted from the video reproduction device 2 and causes the tactile presentation units 22 to provide, to the user, a tactile stimulus based on the tactile data transmitted from the video reproduction device 2 or the tactile data generated by the tactile data generation unit 25.

[1-3. Specific Example of Reproduction Mode Switching]

Next, reproduction mode switching will be explained by giving a specific example. It should be noted that, in the following, it is assumed that wireless communication has been established between the video reproduction device 2 and the aural-tactile presentation device 3 and the reproduction mode decision unit 31 has already acquired the system configuration information transmitted from the system configuration information transmission unit 40.

Here, in the first embodiment, the sound data and the tactile data transmitted from the video reproduction device 2 to the aural-tactile presentation device 3 are transmitted by a communication method of Bluetooth. The wireless communication device 11 and the wireless communication unit 23 in this example can transmit and receive the sound data by using a transmission profile (A2DP (Advanced Audio Distribution Profile)) of stereo sound data specified in Bluetooth. That is, the wireless communication device 11 can transmit, in one channel, two pieces of sound data for the right speaker 21a and for the left speaker 21b.

In addition, the wireless communication device 11 and the wireless communication unit 23 can perform wireless communication by using multiple channels. In this example, wireless communication using one channel is written as 1ch communication, and wireless communication using two channels is written as 2ch communication.

In addition, since the tactile data is a one-dimensional signal as with the sound data, it is assumed that a coding method similar to that for the sound data is used as a coding method.

Therefore, in the case where the 1ch communication is performed, the wireless communication device 11 can transmit two pieces of sound data and tactile data in total. Specifically, the wireless communication device 11 can transmit two pieces of sound data (hereinafter, written as stereo sound data). In addition, the wireless communication device 11 can transmit one piece of sound data (hereinafter, written as monaural sound data) and one piece of tactile data (hereinafter, written as monaural tactile data). Further, the wireless communication device 11 can transmit two pieces of tactile data (hereinafter, written as stereo tactile data).

In addition, in the case where the 2ch communication is performed, the wireless communication device 11 can transmit four pieces of sound data and tactile data in total. Specifically, the wireless communication device 11 can transmit stereo sound data and stereo tactile data.

Figure 7:
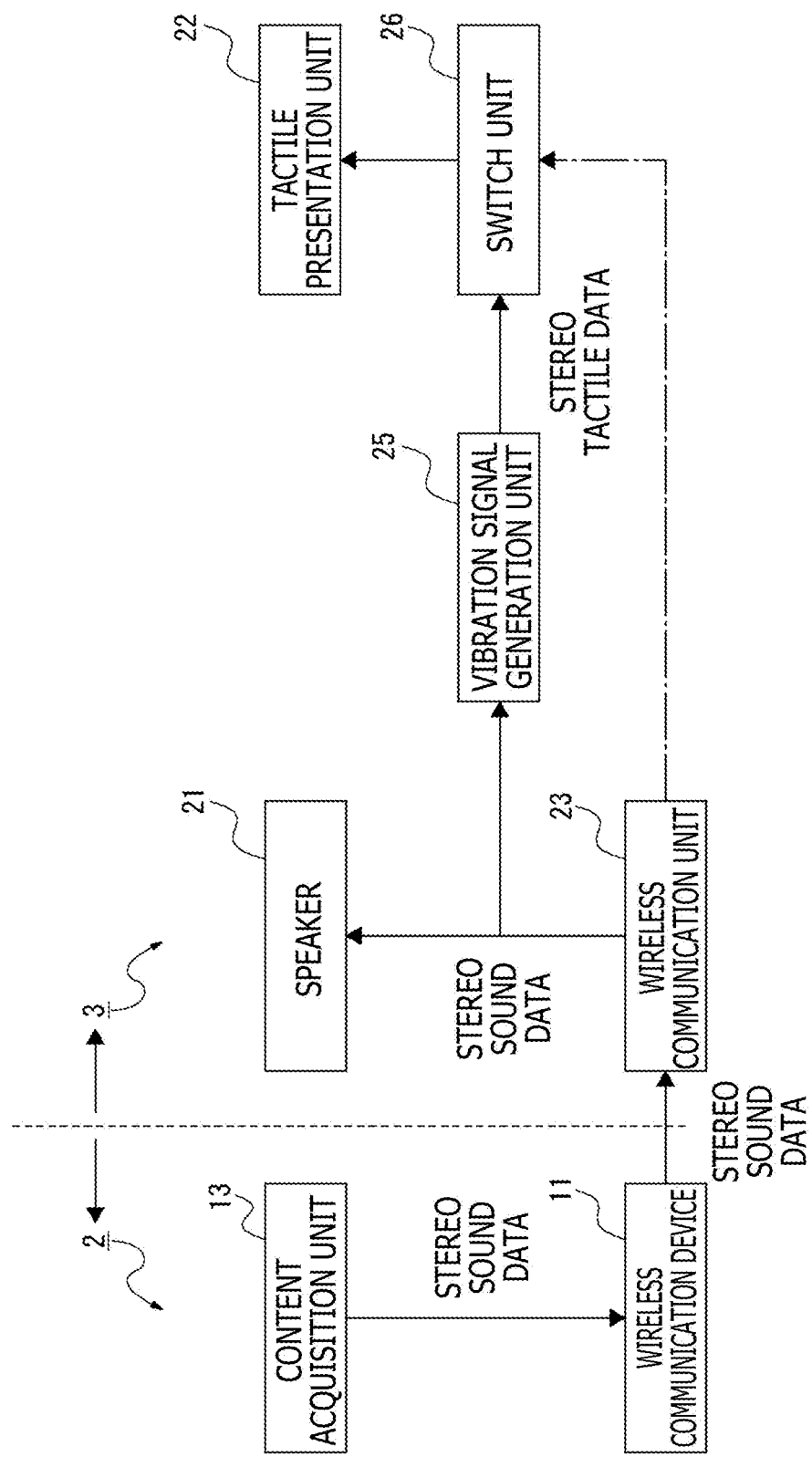
FIG. 7 is a diagram for explaining control in a case where content data includes stereo sound data and wireless communication is 1ch.

FIG. 7 is a diagram for explaining control in a case where the content data includes the stereo sound data and the wireless communication is 1ch. It should be noted that, in FIG. 7 to FIG. 9, paths through which data is transmitted are indicated by solid arrows, and paths through which data is not transmitted are indicated by alternate long and short dash lines.

In the example depicted in FIG. 7, the system configuration information indicates that the wireless communication is 1ch (the number of pieces of data that can be transmitted is two), and the content information indicates that the content data includes the stereo sound data but not the tactile data.

In such a case, the reproduction mode decision unit 31 determines that a total of two pieces of data can be transmitted by the wireless communication device 11 because the wireless communication is 1ch. In addition, the reproduction mode decision unit 31 determines that the content data includes the stereo sound data but not the tactile data.

As a result, the reproduction mode decision unit 31 decides a reproduction mode in which the stereo sound data is transmitted to the aural-tactile presentation device 3 and the stereo tactile data is generated by the tactile data generation unit 25 on the basis of the stereo sound data. Then, the reproduction mode setting unit 32 transmits information indicating the reproduction mode decided by the reproduction mode decision unit 31 to the aural-tactile presentation device 3 via the wireless communication device 11.

The reproduction mode switching unit 41 receives the information indicating the reproduction mode transmitted from the reproduction mode setting unit 32, via the wireless communication unit 23. Then, on the basis of the information indicating the reproduction mode, the reproduction mode switching unit 41 causes the tactile data generation unit 25 to generate the stereo tactile data on the basis of the stereo sound data. In addition, on the basis of the information indicating the reproduction mode, the reproduction mode switching unit 41 switches the switch unit 26 such that the tactile data generated by the tactile data generation unit 25 is input to the tactile presentation units 22.

Accordingly, in the aural-tactile presentation device 3, when the stereo sound data included in the content data is acquired from the video reproduction device 2 via the wireless communication unit 23, the stereo sound data is input to the speakers 21 and also to the tactile data generation unit 25. Then, in the aural-tactile presentation device 3, stereo sound based on the stereo sound data is output from the speakers 21, and a stereo tactile stimulus based on the stereo tactile data generated by the tactile data generation unit 25 is provided from the tactile presentation units 22 to the user.

Figure 8:
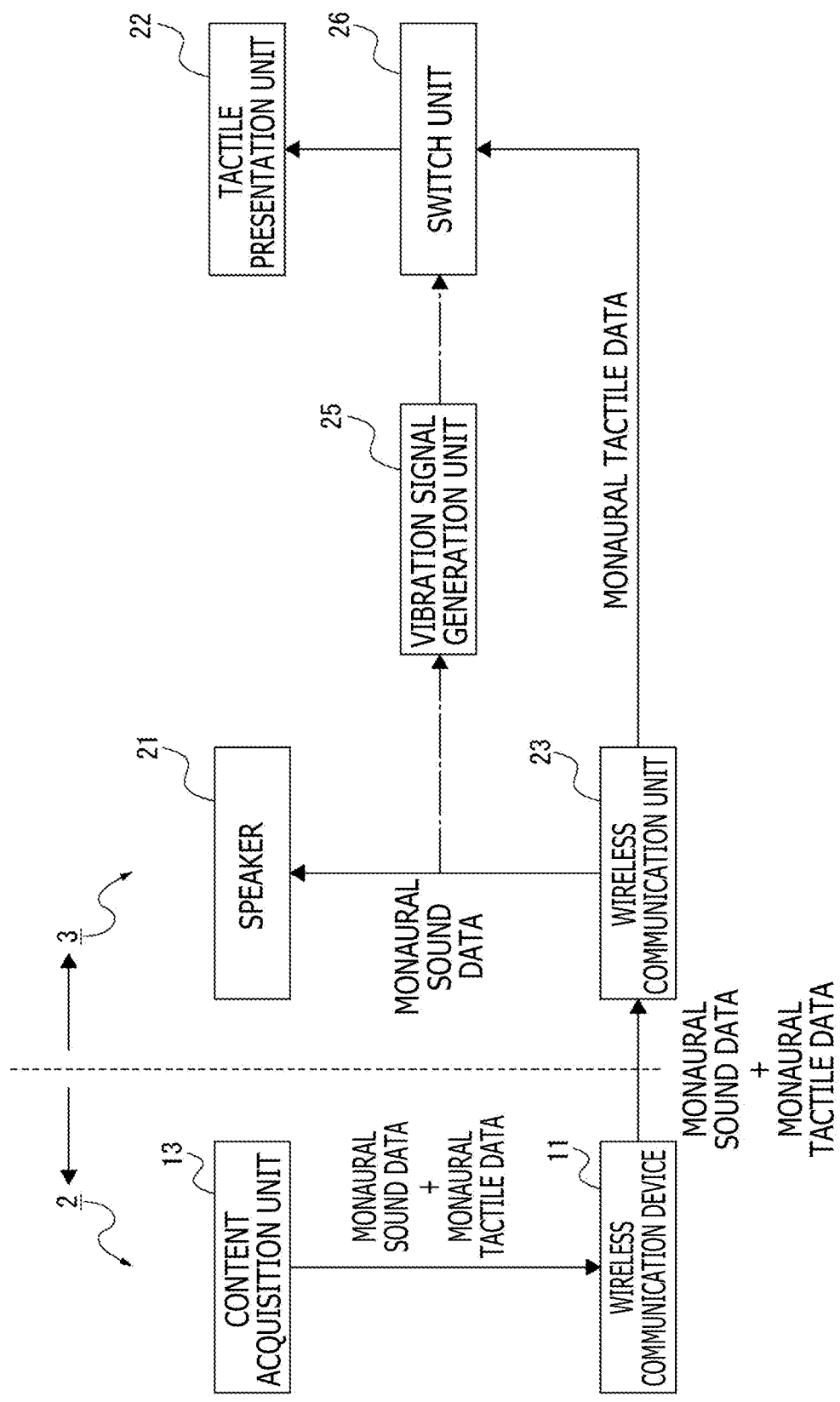
FIG. 8 is a diagram for explaining control in a case where the content data includes monaural sound data and monaural tactile data and the wireless communication is 1ch.

FIG. 8 is a diagram for explaining control in a case where the content data includes the monaural sound data and the monaural tactile data and the wireless communication is 1ch.

In the example depicted in FIG. 8, the system configuration information indicates that the wireless communication is 1ch, and the content information indicates that the content data includes the monaural sound data and the monaural tactile data.

In such a case, the reproduction mode decision unit 31 determines that a total of two pieces of data can be transmitted by the wireless communication device 11 because the wireless communication is 1ch. In addition, the reproduction mode decision unit 31 determines that the content data includes the monaural sound data and the monaural tactile data.

As a result, the reproduction mode decision unit 31 decides a reproduction mode in which the monaural sound data and the monaural tactile data are transmitted to the aural-tactile presentation device 3, sound is output on the basis of the transmitted monaural sound data, and a tactile stimulus is provided on the basis of the transmitted monaural tactile data. Then, the reproduction mode setting unit 32 transmits information indicating the reproduction mode decided by the reproduction mode decision unit 31 to the aural-tactile presentation device 3 via the wireless communication device 11.

The reproduction mode switching unit 41 receives the information indicating the reproduction mode transmitted from the reproduction mode setting unit 32, via the wireless communication unit 23. Then, on the basis of the information indicating the reproduction mode, the reproduction mode switching unit 41 stops the tactile data generation unit 25 and switches the switch unit 26 such that the monaural tactile data transmitted from the video reproduction device 2 is input to the tactile presentation units 22.

Accordingly, in the aural-tactile presentation device 3, when the monaural sound data included in the content data is acquired from the video reproduction device 2 via the wireless communication unit 23, monaural sound based on the monaural sound data is output to the speakers 21. In addition, in the aural-tactile presentation device 3, when the monaural tactile data included in the content data is acquired from the video reproduction device 2 via the wireless communication unit 23, a monaural tactile stimulus based on the monaural tactile data is provided from the tactile presentation units 22 to the user. At this time, the same sound is output from both the right speaker 21a and the left speaker 21b, and the same tactile stimulus (vibration) is provided from both the right tactile presentation unit 22a and the left tactile presentation unit 22b.

Figure 9:
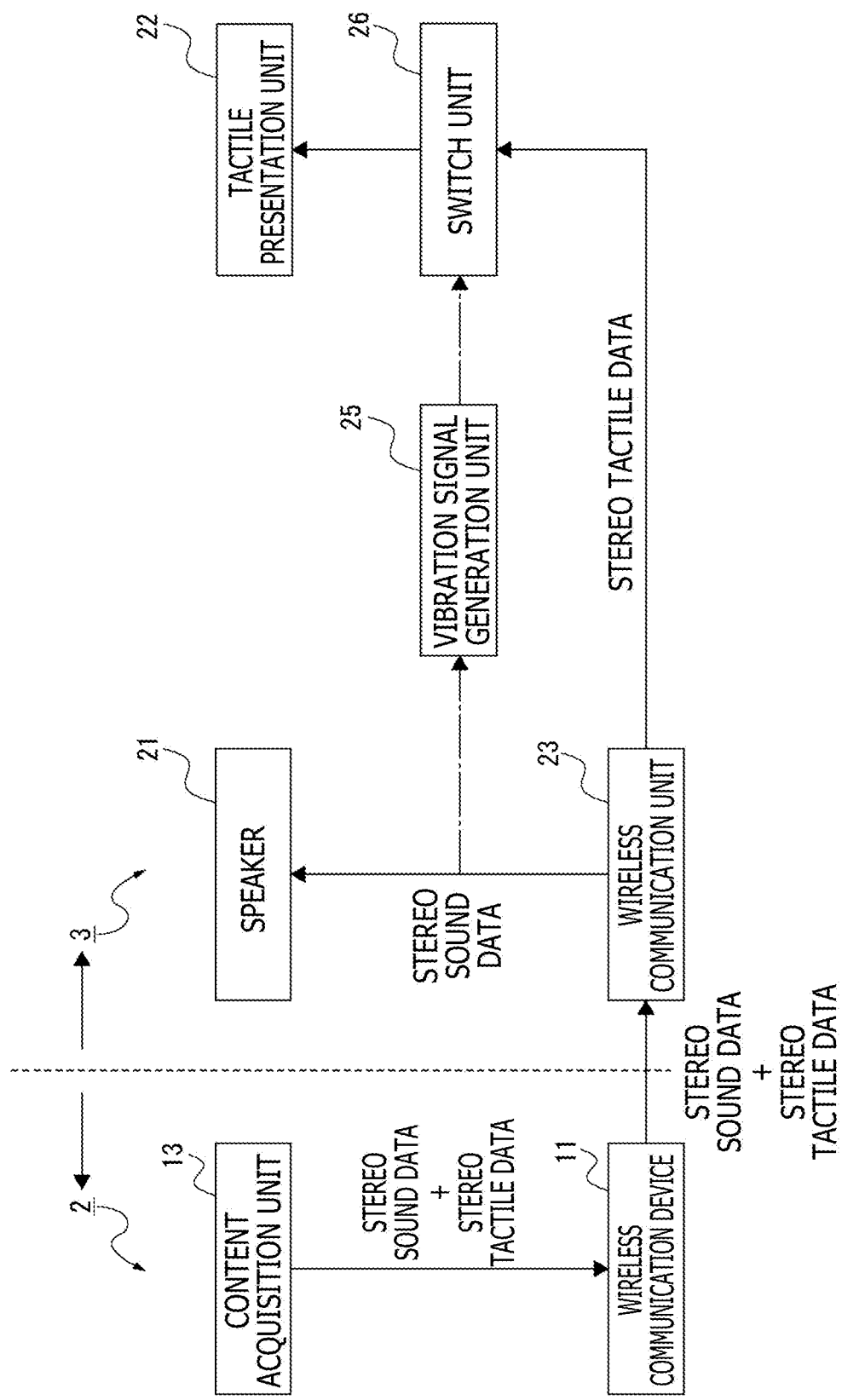
FIG. 9 is a diagram for explaining control in a case where the content data includes stereo sound data and stereo tactile data and the wireless communication is 2ch.

FIG. 9 is a diagram for explaining control in a case where the content data includes the stereo sound data and the stereo tactile data and the wireless communication is 2ch.

In the example depicted in FIG. 9, the system configuration information indicates that the wireless communication is 2ch, and the content information indicates that the content data includes the stereo sound data and the stereo tactile data.

In such a case, the reproduction mode decision unit 31 determines that a total of four pieces of data can be transmitted by the wireless communication device 11 because the wireless communication is 2ch. In addition, the reproduction mode decision unit 31 determines that the content data includes the stereo sound data and the stereo tactile data.

As a result, the reproduction mode decision unit 31 decides a reproduction mode in which the stereo sound data and the stereo tactile data are transmitted to the aural-tactile presentation device 3, sound is output on the basis of the transmitted stereo sound data, and a tactile stimulus is provided on the basis of the transmitted stereo tactile data. Then, the reproduction mode setting unit 32 transmits information indicating the reproduction mode decided by the reproduction mode decision unit 31 to the aural-tactile presentation device 3 via the wireless communication device 11.

The reproduction mode switching unit 41 receives the information indicating the reproduction mode transmitted from the reproduction mode setting unit 32, via the wireless communication unit 23. Then, on the basis of the information indicating the reproduction mode, the reproduction mode switching unit 41 stops the tactile data generation unit 25 and switches the switch unit 26 such that the stereo tactile data transmitted from the video reproduction device 2 is input to the tactile presentation units 22.

Accordingly, in the aural-tactile presentation device 3, when the stereo sound data included in the content data is acquired from the video reproduction device 2 via the wireless communication unit 23, stereo sound based on the stereo sound data is output to the speakers 21. In addition, in the aural-tactile presentation device 3, when the stereo tactile data included in the content data is acquired from the video reproduction device 2 via the wireless communication unit 23, a stereo tactile stimulus based on the stereo tactile data is provided from the tactile presentation units 22 to the user.

[1-4. Processing of Content Reproduction System]

Figure 10:
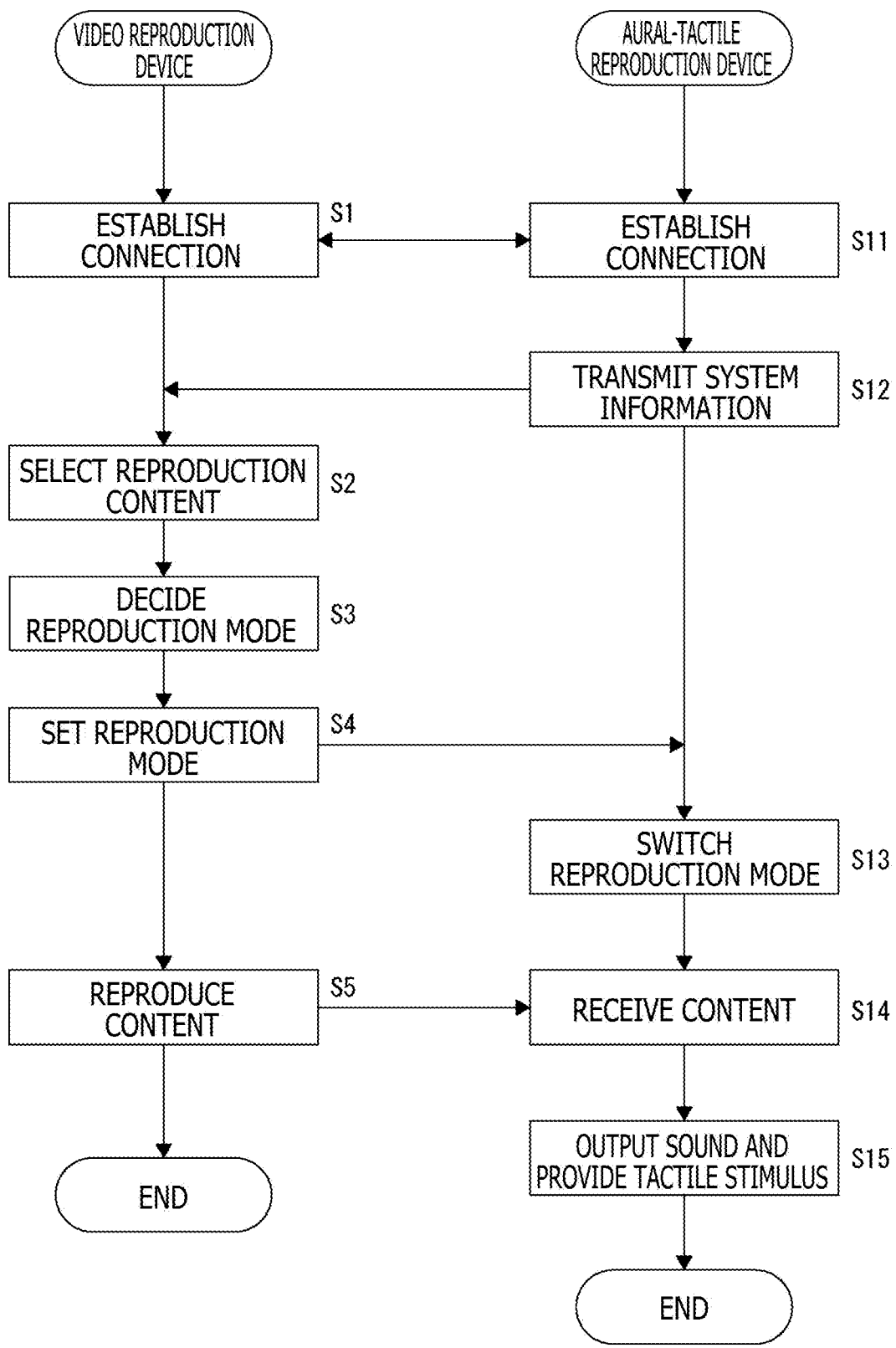
FIG. 10 is a sequence chart for depicting a flow of processing of the content reproduction system in the first embodiment.

FIG. 10 is a sequence chart for depicting a flow of processing of the content reproduction system 1 in the first embodiment. As depicted in FIG. 10, in the content reproduction system 1, when power supplies of the video reproduction device 2 and the aural-tactile presentation device 3 are turned on, the control unit 16 establishes wireless communication with the aural-tactile presentation device 3 in Step S1. In addition, the control unit 24 establishes wireless communication with the video reproduction device 2 in Step S11.

When the wireless communication is established in Steps S1 and S11, the system configuration information transmission unit 40 transmits the system configuration information of the aural-tactile presentation device 3 to the video reproduction device 2 via the wireless communication unit 23 in Step S12.

When content is selected via the operation unit 12 in Step S2, the content reproduction unit 33 acquires content information of the selected content. It should be noted that the content information may be acquired by analyzing the content data or may be included in the content data.

Then, in Step S3, the reproduction mode decision unit 31 decides a reproduction mode on the basis of the system configuration information received from the aural-tactile presentation device 3 and the content information of the selected content. In addition, in Step S4, the reproduction mode setting unit 32 transmits the information indicating the reproduction mode decided in Step S3 to the aural-tactile presentation device 3.

When the aural-tactile presentation device 3 receives the information indicating the reproduction mode transmitted from the video reproduction device 2, the reproduction mode switching unit 41 controls the tactile data generation unit 25 and the switch unit 26 on the basis of the information indicating the reproduction mode in Step S13. Here, the reproduction mode switching unit 41 switches whether or not to cause the tactile data generation unit 25 to generate the tactile data, and switches the switch unit 26 regarding which piece of tactile data a tactile stimulus to be provided from the tactile presentation units 22 is to be based on.

In the video reproduction device 2, when a predetermined lapse time elapses from the end of the selection of the content in Step S2, the content reproduction unit 33 causes the content acquisition unit 13 to receive the content data in Step S5. In addition, the content reproduction unit 33 causes the display unit 15 to display a video based on the video data included in the content data. In addition, the content reproduction unit 33 transmits one of or both the sound data and the tactile data included in the content data to the aural-tactile presentation device 3.

In the aural-tactile presentation device 3, the content reproduction unit 42 receives one of or both the sound data and the tactile data in Step S14. Then, in Step S15, the content reproduction unit 42 outputs sound based on the sound data from the speakers 21 and causes the tactile presentation units 22 to provide a tactile stimulus based on the tactile data to the user on the basis of the reproduction mode switched in Step S13.

2. Second Embodiment

[2-1. Circuit Configuration of Content Reproduction System]

Figure 11:
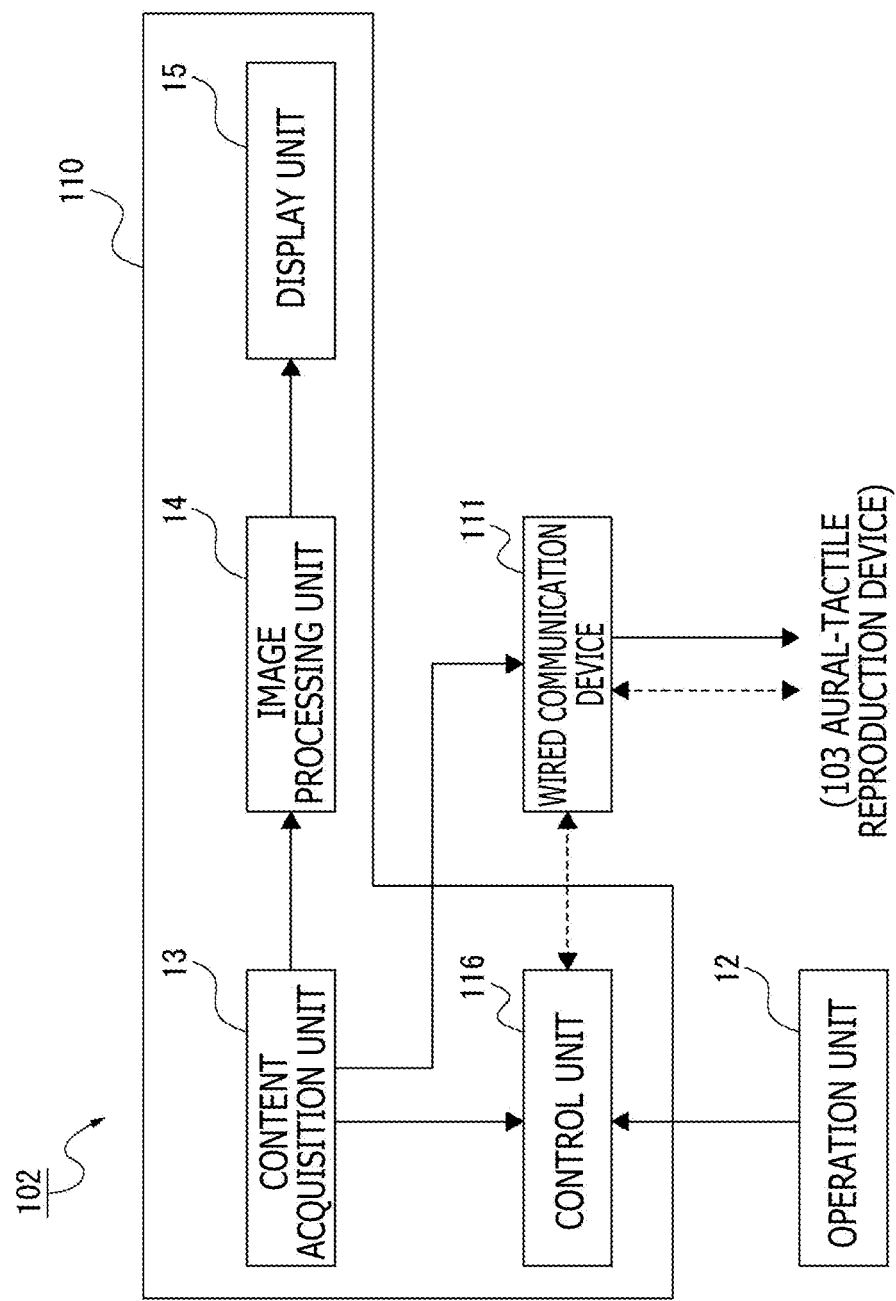
FIG. 11 is a block diagram of a video reproduction device of a second embodiment.
Figure 12:
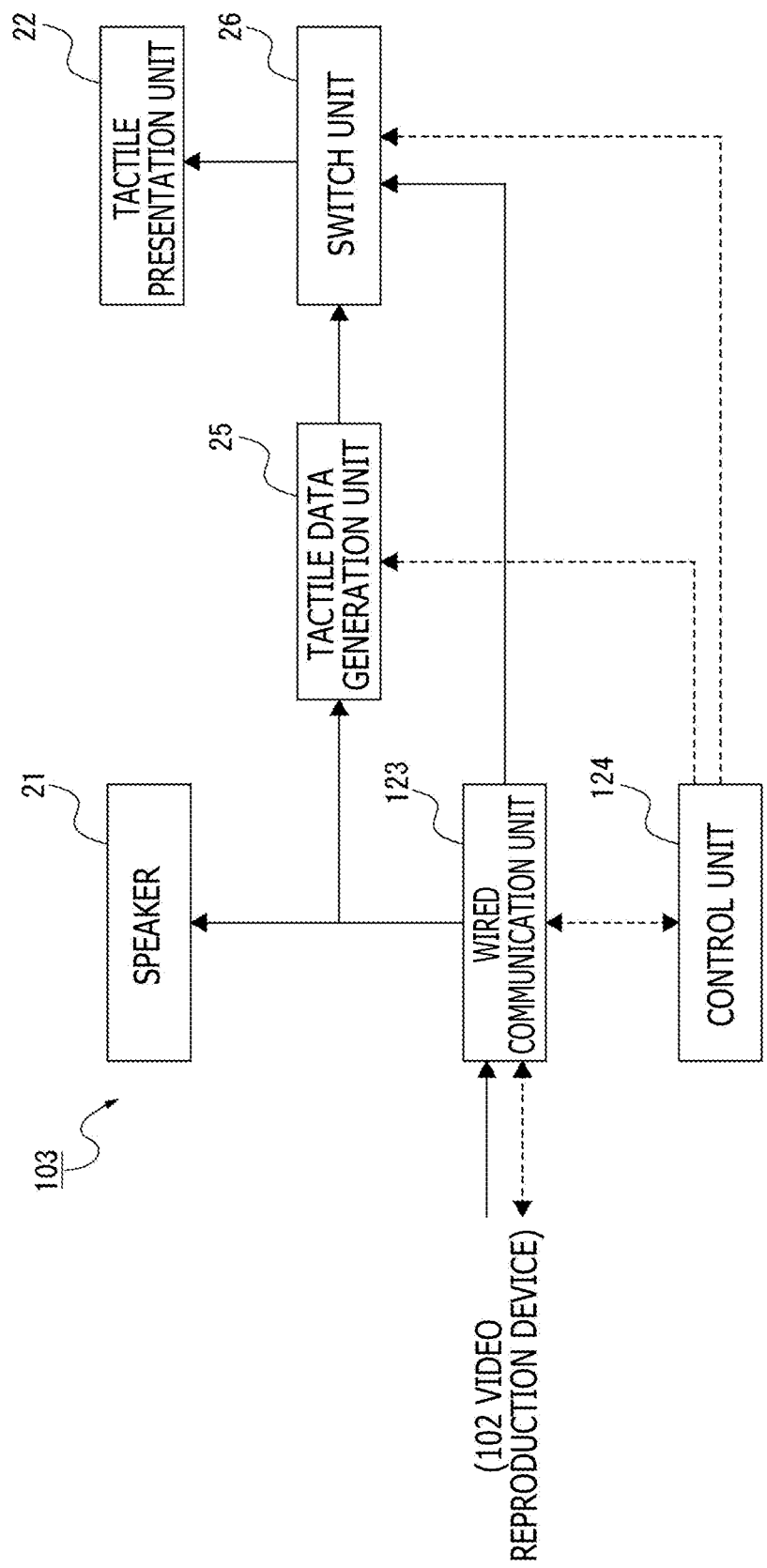
FIG. 12 is a block diagram of an aural-tactile presentation device of the second embodiment.

FIG. 11 is a block diagram of a video reproduction device 102 of a second embodiment. FIG. 12 is a block diagram of an aural-tactile presentation device 103 of the second embodiment. It should be noted that, in FIG. 11 and FIG. 12, a flow of all or part of content data is indicated by solid arrows, and a flow of signals for performing control is indicated by dashed arrows.

It should be noted that, in the following explanation, parts similar to those already explained are denoted by the same reference signs, and the explanation thereof is omitted.

A content reproduction system 100 of the second embodiment includes the video reproduction device 102 and the aural-tactile presentation device 103. The aural-tactile presentation device 103 is one embodiment of a control device according to the present technique.

As depicted in FIG. 11, the video reproduction device 102 of the second embodiment includes a television device 110, a wired communication device 111, and the operation unit 12. The television device 110 includes the content acquisition unit 13, the image processing unit 14, the display unit 15, and a control unit 116.

The control unit 116 includes a microcomputer having, for example, a CPU, a ROM, a RAM, and the like and performs overall control of the video reproduction device 102 by executing processing according to a program stored in the ROM. In addition, the control unit 116 performs wired communication with the aural-tactile presentation device 103 via the wired communication device 111.

The wired communication device 111 can perform wired communication by, for example, a communication method in the IEC (International Electrotechnical Commission) format, which is an international standard, or more specifically, an HDMI (High-Definition Multimedia Interface: registered trademark) method. It should be noted that, although the television device 110 and the wired communication device 111 are separately provided in the video reproduction device 102, the television device 110 and the wired communication device 111 may integrally be provided.

As depicted in FIG. 12, the aural-tactile presentation device 103 of the second embodiment includes the speakers 21, the tactile presentation units 22, a wired communication unit 123, a control unit 124, the tactile data generation unit 25, and the switch unit 26.

The wired communication unit 123 can perform, for example, wired communication by a communication method in the IEC format, which is an international standard, or more specifically, an HDMI method.

The control unit 124 includes a microcomputer having, for example, a CPU, a ROM, a RAM, and the like and performs overall control of the aural-tactile presentation device 103 by executing processing according to a program stored in the ROM. In addition, the control unit 124 performs wired communication with the video reproduction device 102 via the wired communication unit 123.

When content data corresponding to the content selected via the operation unit 12 is acquired from the content acquisition unit 13, the video reproduction device 102 transmits sound data and tactile data included in the content data to the aural-tactile presentation device 103 via the wired communication device 111 according to the HDMI method.

Here, for example, 5.1ch sound data can be transmitted in a conventional HDMI method. That is, up to six pieces of sound data can be transmitted in the conventional HDMI method. Further, as described above, since the tactile data is a one-dimensional signal as with the sound data, it is possible to transmit the tactile data in place of one or more pieces of sound data in 5.1ch in the HDMI method. It should be noted that, in the following, data transmitted from the video reproduction device 102 to the aural-tactile presentation device 103 is written as standard data.

In addition, the standard data includes content information indicating, for example, which position (region) each piece of data in 5.1ch corresponds to and what kind of data each piece of data in 5.1ch is. For example, the content information indicates which position (right, left, center, right rear, left rear, or the like) the sound data corresponds to and which region (neck, body, hand, leg, or the like, or almighty that corresponds to any region) the tactile data corresponds to.

Therefore, in the video reproduction device 102, when the content data is acquired, the standard data (the sound data, the tactile data, and the content information) included in the content data is transmitted to the aural-tactile presentation device 103 via the wired communication device 111.

Figure 13:
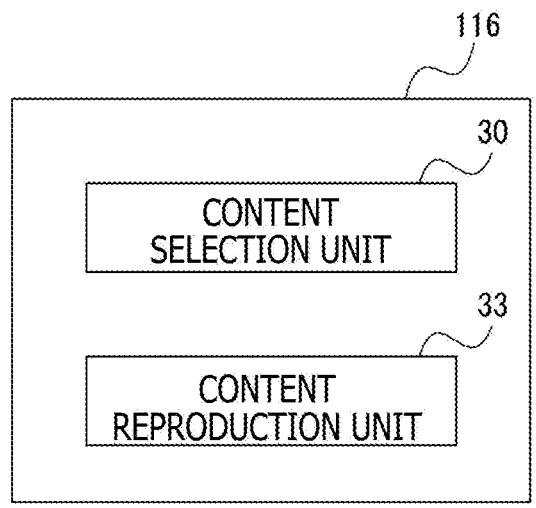
FIG. 13 is a block diagram for explaining a functional configuration of a control unit of the second embodiment.

FIG. 13 is a block diagram for explaining a functional configuration of the control unit 116 of the second embodiment. As depicted in FIG. 13, the control unit 116 functions as the content selection unit 30 and the content reproduction unit 33. Thus, the control unit 116 of the second embodiment differs from the control unit 16 of the first embodiment in that the control unit 116 does not function as the reproduction mode decision unit 31 and the reproduction mode setting unit 32. It should be noted that the control unit 116 may have function units functioning as units other than the content selection unit 30 and the content reproduction unit 33.

Figure 14:
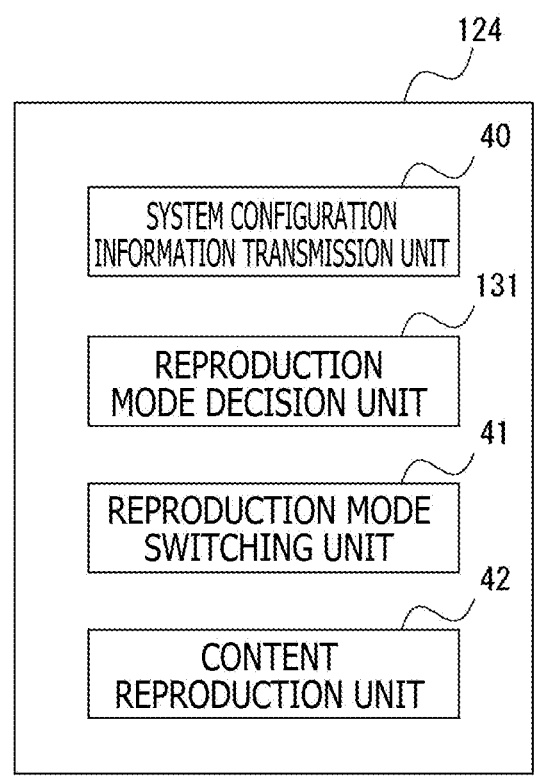
FIG. 14 is a block diagram for explaining a functional configuration of a control unit of the second embodiment.

FIG. 14 is a block diagram for explaining a functional configuration of the control unit 124 of the second embodiment. As depicted in FIG. 14, the control unit 124 functions as the system configuration information transmission unit 40, a reproduction mode decision unit 131, the reproduction mode switching unit 41, and the content reproduction unit 42. Thus, the control unit 124 of the second embodiment differs from the control unit 24 of the first embodiment in that the control unit 124 newly functions as the reproduction mode decision unit 131. It should be noted that the control unit 24 may have function units functioning as units other than the system configuration information transmission unit 40, the reproduction mode decision unit 131, the reproduction mode switching unit 41, and the content reproduction unit 42.

When wired communication is established with the video reproduction device 102 via the wired communication unit 123, the system configuration information transmission unit 40 transmits system configuration information of the aural-tactile presentation device 103 to the video reproduction device 102. It should be noted that the system configuration information includes configuration information of the aural-tactile presentation device 103, information related to a communication method of the wired communication, and the like.

The reproduction mode decision unit 131 decides the reproduction mode of the content data on the basis of the system configuration information of the aural-tactile presentation device 103 and the content information included in the standard data transmitted from the video reproduction device 102. The reproduction mode decision unit 131 and the reproduction mode switching unit 41 are one embodiment of a switching control unit according to the present technique. In addition, the content reproduction unit 42 is one embodiment of a reproduction unit according to the present technique.

[2-2. Specific Example of Reproduction Mode Switching]

Figure 15:
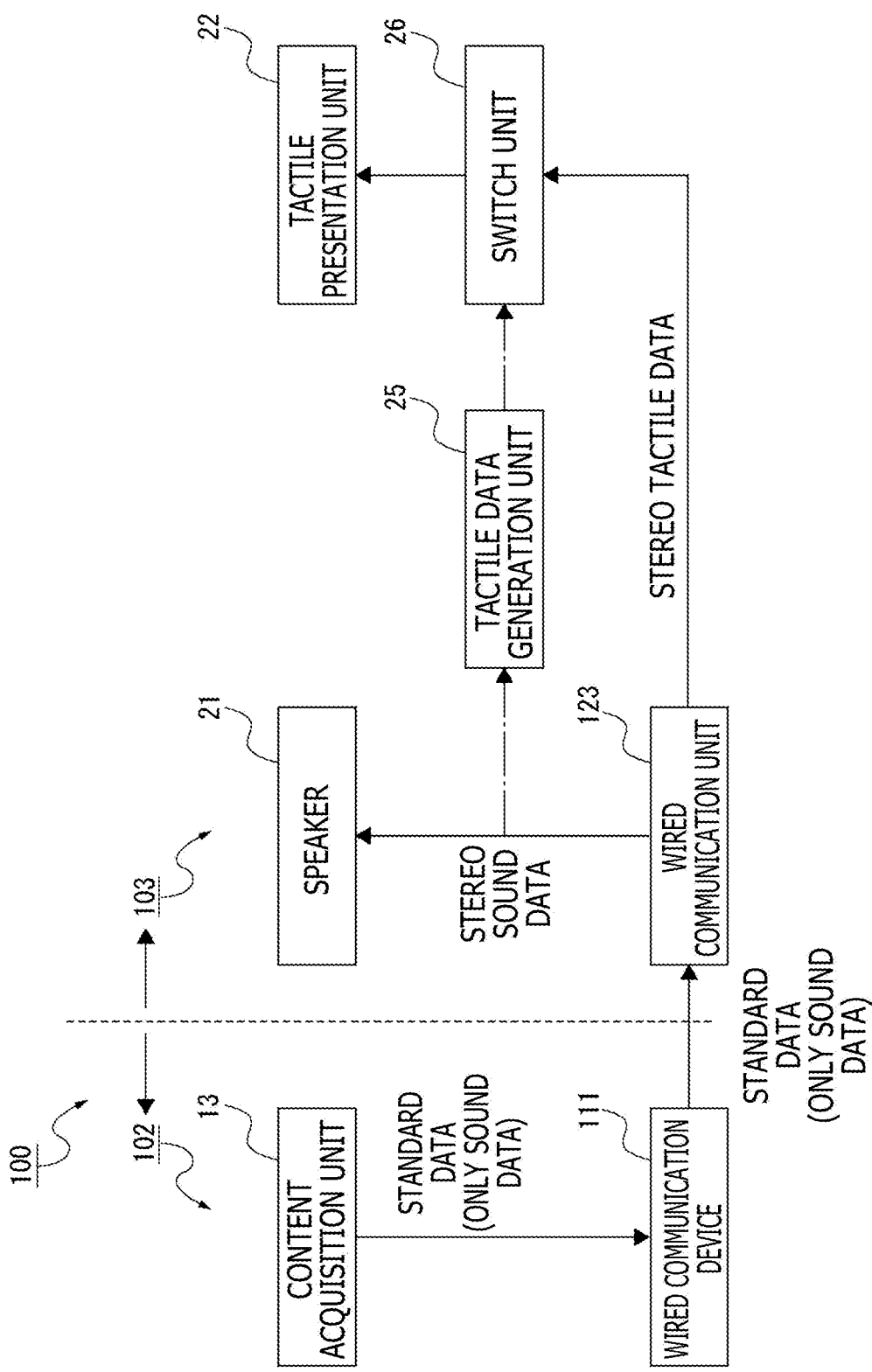
FIG. 15 is a diagram for explaining control in a case where only sound data is included in standard data.

FIG. 15 is a diagram for explaining control in a case where only sound data is included in the standard data. It should be noted that, in FIG. 15 to FIG. 17, paths through which data is transmitted are indicated by solid arrows, and paths through which data is not transmitted are indicated by alternate long and short dash lines.

In the example depicted in FIG. 15, the system configuration information indicates that the speakers 21 are stereo speakers and the tactile presentation units 22 are stereo tactile presentation units, and the content information indicates that the standard data includes, for example, 5.1ch sound data but not the tactile data.

In such a case, the reproduction mode decision unit 131 determines that the standard data includes the stereo sound data but not the tactile data.

As a result, the reproduction mode decision unit 131 decides a reproduction mode in which stereo sound is output from the speakers 21 on the basis of the sound data (stereo sound data) corresponding to the right and left in the standard data and stereo tactile data is generated by the tactile data generation unit 25 on the basis of the stereo sound data.

On the basis of the information indicating the decided reproduction mode, the reproduction mode switching unit 41 causes the tactile data generation unit 25 to generate stereo tactile data on the basis of the stereo sound data. In addition, on the basis of the information indicating the reproduction mode, the reproduction mode switching unit 41 switches the switch unit 26 such that the stereo tactile data generated by the tactile data generation unit 25 is input to the tactile presentation units 22.

Thus, in the aural-tactile presentation device 103, the stereo sound data included in the standard data is input to the speakers 21 and also to the tactile data generation unit 25. Then, in the aural-tactile presentation device 103, stereo sound is output from the speakers 21 on the basis of the stereo sound data, and a stereo tactile stimulus based on the stereo tactile data generated by the tactile data generation unit 25 is provided from the tactile presentation units 22 to the user.

FIG. 16 is a first diagram for explaining control in a case where the sound data and the tactile data are included in the standard data.

In the example depicted in FIG. 16, the system configuration information indicates that the speakers 21 are stereo speakers and the tactile presentation units 22 are stereo tactile presentation units, and the content information indicates that the standard data includes stereo sound data and tactile data of left and right sides of the neck in, for example, 5.1ch.

In such a case, the reproduction mode decision unit 131 determines that the standard data includes the stereo sound data and the tactile data of the left and right sides of the neck.

As a result, the reproduction mode decision unit 131 decides a reproduction mode in which stereo sound is output from the speakers 21 on the basis of the stereo sound data in the standard data and a stereo tactile stimulus is provided on the basis of the stereo tactile data of the left and right sides of the neck in the standard data.

On the basis of the information indicating the reproduction mode, the reproduction mode switching unit 41 stops the tactile data generation unit 25 and switches the switch unit 26 such that the stereo tactile data of the left and right sides of the neck in the standard data is input to the tactile presentation units 22.

Thus, in the aural-tactile presentation device 103, the stereo sound data included in the standard data is output from the speakers 21. In addition, in the aural-tactile presentation device 103, the stereo tactile stimulus based on the stereo tactile data of the left and right sides of the neck in the standard data is provided from the tactile presentation units 22 to the user. It should be noted that, even in a case where the standard data includes almighty tactile data, a tactile stimulus based on the almighty tactile data in the standard data is provided from the tactile presentation units 22 to the user in the aural-tactile presentation device 103 under the control as depicted in FIG. 16.

FIG. 17 is a second diagram for explaining control in the case where the sound data and the tactile data are included in the standard data.

In the example depicted in FIG. 17, the system configuration information indicates that the speakers 21 are stereo speakers and the tactile presentation units 22 are stereo tactile presentation units, and the content information indicates that the standard data includes stereo sound data and tactile data of other regions than the left and right sides of the neck and almighty in, for example, 5.1ch.

In such a case, the reproduction mode decision unit 131 determines that the standard data includes the stereo sound data and the tactile data of other regions than the left and right sides of the neck and almighty, which do not correspond to the tactile presentation units 22.

As a result, the reproduction mode decision unit 131 decides a reproduction mode in which stereo sound is output from the speakers 21 on the basis of the stereo sound data in the standard data and the stereo tactile data is generated by the tactile data generation unit 25 on the basis of the stereo sound data.

On the basis of the information indicating the reproduction mode, the reproduction mode switching unit 41 causes the tactile data generation unit 25 to generate the stereo tactile data on the basis of the stereo sound data. In addition, on the basis of the information indicating the reproduction mode, the reproduction mode switching unit 41 switches the switch unit 26 such that the tactile data generated by the tactile data generation unit 25 is input to the tactile presentation units 22.

Thus, in the aural-tactile presentation device 103, the stereo sound data included in the standard data is input to the speakers 21 and also to the tactile data generation unit 25. Then, in the aural-tactile presentation device 103, stereo sound is output from the speakers 21 on the basis of the stereo sound data, and a stereo tactile stimulus based on the stereo tactile data generated by the tactile data generation unit 25 is provided from the tactile presentation units 22 to the user.

[2-3. Processing of Content Reproduction System]

FIG. 18 is a sequence chart for depicting a flow of processing of the content reproduction system 100 in the second embodiment. As depicted in FIG. 18, in the content reproduction system 100, when power supplies of the video reproduction device 102 and the aural-tactile presentation device 103 are turned on, the control unit 116 establishes wired communication with the aural-tactile presentation device 103 in Step S101. In addition, the control unit 124 establishes wired communication with the video reproduction device 102 in Step S111.

When the wired communication is established in Steps S101 and S111, the system configuration information transmission unit 40 transmits the system configuration information of the aural-tactile presentation device 103 to the video reproduction device 102 via the wired communication unit 123 in Step S112.

When content is selected via the operation unit 12, in Step S102, the content reproduction unit 33 causes the content acquisition unit 13 to receive content data of the selected content. In addition, the content reproduction unit 33 causes the display unit 15 to display a video based on the video data included in the content data. In addition, the content reproduction unit 33 transmits the standard data included in the content data to the aural-tactile presentation device 103.

When receiving the standard data transmitted from the video reproduction device 102, in the aural-tactile presentation device 3, the reproduction mode decision unit 131 analyzes the content information included in the standard data in Step S113.

Then, in Step S114, the reproduction mode decision unit 131 determines whether the tactile data is included in the standard data, according to an analysis result of the content information. As a result, in a case where it is determined that the tactile data is included (Yes in Step S114), the reproduction mode decision unit 131 determines in Step S115 whether the corresponding region of the tactile data is the neck or almighty according to the analysis result of the content information.

Then, in a case where it is determined that the corresponding region of the tactile data is the neck or almighty (Yes in Step S115), the reproduction mode decision unit 131 decides in Step S116 a reproduction mode (written as a tactile presentation mode in the drawing) in which the tactile data generation unit 25 and the switch unit 26 are controlled to provide a tactile stimulus based on the tactile data included in the content data.

On the other hand, in a case where it is determined that the tactile data is not included (No in Step S114), and in a case where it is determined that the corresponding region of the tactile data is not the neck or almighty (No in Step S115), the reproduction mode decision unit 131 decides in Step S117 a reproduction mode (written as a tactile generation mode in the drawing) in which the tactile data generation unit 25 and the switch unit 26 are controlled to generate the tactile data by the tactile data generation unit 25 on the basis of the sound data included in the content data.

In Step S118, the reproduction mode switching unit 41 controls the tactile data generation unit 25 and the switch unit 26 on the basis of the reproduction mode decided in Step S116 or Step S117.

In addition, in Step S119, the content reproduction unit 42 outputs sound based on the sound data from the speakers 21 and causes the tactile presentation units 22 to provide a tactile stimulus based on the tactile data to the user on the basis of the reproduction mode switched in Step S118.

3. Modified Example

It should be noted that the embodiments are not limited to the specific examples described above, and configurations as various modified examples can be employed.

It should be noted that, in the first embodiment and the second embodiment, on the basis of the content information and the system configuration information of the aural-tactile presentation devices 3 and 103, the tactile data input to the tactile presentation units 22 is switched to either the tactile data generated by the tactile data generation unit 25 or the tactile data included in the content data. However, on the basis of at least the content information, the tactile data input to the tactile presentation units 22 may be switched to either the tactile data generated by the tactile data generation unit 25 or the tactile data included in the content data.

In addition, while wired communication is performed between the video reproduction device 102 and the aural-tactile presentation device 103 in the second embodiment, wireless communication may be performed if the standard data can be transmitted. Specifically, for example, data communication based on the HDMI method may be performed by wireless communication.

In addition, the video reproduction device 2 of the first embodiment may transmit the tactile data in advance such that the tactile stimulus is not interrupted due to communication interruption of wireless communication.

Here, the sound data generally includes background sound such as environmental sound, instrumentals, and songs, voices such as dialogues of characters and narrations, and additional sound effects to enhance the content. Therefore, the sound data does not become a non-signal (silent) in most scenes of the content.

Meanwhile, the tactile data includes, for example, a vibration stimulus that expresses a feeling of the time when a character touches an object or an impact generated when objects collide. In general, the tactile stimulus is often used only in distinctive scenes for effective use. In addition, there is a possibility that the user feels discomfort or health is affected when constantly feeling vibrations. Hence, the tactile data is not always generated unlike sound.

Therefore, the tactile data becomes intermittent data in which a state of no data continues for a while after short-time data is generated. Therefore, in the state of no tactile data, tactile data to be reproduced later can be transmitted in advance.

In addition, in the first embodiment and the second embodiment, the tactile data may be transmitted multiple times from the video reproduction devices 2 and 102 to the aural-tactile presentation devices 3 and 103. In this case, for example, such information as "present in three seconds," "present in two seconds," "present in one second," and "present" may be transmitted together with the tactile data. Accordingly, it is possible to reduce the interruption of the presentation of the tactile stimulus due to communication interruption of wireless communication.

In addition, in the first embodiment and the second embodiment, in the case where the tactile data is transmitted from the video reproduction devices 2 and 102 to the aural-tactile presentation devices 3 and 103 and the tactile stimulus is provided on the basis of the transmitted tactile data, the tactile data may be generated by the tactile data generation unit 25 when only the tactile data cannot temporarily be transmitted. In this case, it is sufficient if, when the transmission of the tactile data is restored, the tactile stimulus is provided on the basis of the transmitted tactile data.

In addition, the aural-tactile presentation devices 3 and 103 in the first embodiment and the second embodiment may be capable of adjusting intensity of the tactile stimulus (vibration) automatically or manually. For example, the intensity may be made adjustable in consideration of posture and clothes of the user at the time of usage, a level of reproduction sound of the content, and the like.

In addition, weights of the aural-tactile presentation devices 3 and 103 in the first embodiment and the second embodiment may be made adjustable. Accordingly, it is possible to provide a sufficient tactile stimulus to the user by adjusting a degree of adhesion of the tactile presentation units 22 to the user. In addition, the tactile presentation units 22 may adhere to the user by using a belt or the like.

In addition, in the case where wireless communication is performed in the first embodiment and the second embodiment, the sound data and the tactile data may be transmitted in a case where a communication speed (communication band) is sufficiently obtained, and only the sound data may be transmitted in a case where the communication speed (communication band) is not sufficiently obtained. In this case, it is sufficient if the tactile data is generated by the tactile data generation unit 25 on the basis of the sound data.

In addition, while the content data (standard data) is transmitted from the video reproduction device 2 or 102 to one aural-tactile presentation device 3 or 103 in the first embodiment and the second embodiment, the content data (standard data) may be transmitted to multiple aural-tactile presentation devices 3 or 103. In this case, if the communication band is insufficient, only the sound data may be transmitted, and the tactile data may be generated by the tactile data generation unit 25 on the basis of the sound data.

In addition, in the first embodiment and the second embodiment, the user may be able to select whether to provide a vibration stimulus on the basis of the tactile data included in the content data or to provide a vibration stimulus by generating the tactile data by the tactile data generation unit 25 on the basis of the sound data included in the content data, that is, select the tactile data. In this case, in a case where the user selects to provide a tactile stimulus on the basis of the tactile data generated by the tactile data generation unit 25, the fact may be displayed (notified) on the display unit 15 by a GUI or the like.

In addition, in a case where multiple aural-tactile presentation devices 3 or 103 are connected to the video reproduction device 2 or 102 and the tactile data is selected by one of the aural-tactile presentation devices 3 or 103, a tactile stimulus may also be provided to another of the aural-tactile presentation devices 3 or 103 on the basis of the selected tactile data.

In addition, in the first embodiment and the second embodiment, the user may select not to provide a tactile stimulus. In this case, the sound of the band corresponding to the tactile data may be output from the speakers 21. Accordingly, the tactile stimulus (vibration) can be converted into sound and output, and performance effects can be improved.

In addition, in the first embodiment, the system configuration information, the information indicating the reproduction mode, and the sound data and tactile data included in the content data are transmitted by the communication method of Bluetooth, but the system configuration information and the information indicating the reproduction mode may be transmitted by the communication method of Bluetooth, and the sound data and tactile data included in the content data may be transmitted by, for example, another method such as Wifi, 5G, or wired communication.

In addition, in the second embodiment, the tactile stimulus is provided from the tactile presentation units 22 on the basis of the tactile data of the neck or almighty, but the tactile stimulus may be provided from the tactile presentation units 22 on the condition that there are tactile presentation units corresponding to other regions.

In addition, the reproduction modes set in the first embodiment and the second embodiment may be stored when the power supply is turned off, and may be read and set when the power supply is turned on again.

4. Summary

As described above, a control device (aural-tactile presentation device 3, video reproduction device 102) as an embodiment includes a reproduction unit (content reproduction unit 33, content reproduction unit 42) that causes stereo speakers (speakers 21) of an aural-tactile presentation device (3, 103) to output sound on the basis of sound data and causes tactile presentation units (22) provided corresponding to the respective stereo speakers in the aural-tactile presentation device to provide a tactile stimulus on the basis of tactile data, and a switching control unit that switches, on the basis of content information of content data including at least the sound data, the tactile data to be input to the tactile presentation units to either the tactile data generated by a tactile data generation unit on the basis of the sound data or the tactile data included in the content data.

Accordingly, it is possible to switch the tactile data to be input to the tactile presentation units, according to the content data.

Hence, a tactile stimulus suitable for each piece of content can be provided from the tactile presentation units to the user.

In addition, in the control device as the embodiment, it is desirable that the switching control unit perform switching on the basis of the content information and system configuration information of the aural-tactile presentation device.

Accordingly, it is possible to switch the tactile data to be input to the tactile presentation units, according to the content data and the system configuration of the aural-tactile presentation device.

Hence, a tactile stimulus suitable for the content and the system configuration of the aural-tactile presentation device can be provided from the tactile presentation units to the user.

In addition, in the control device as the embodiment, it is desirable that the sound data and the tactile data be transmitted by wireless communication in the aural-tactile presentation device, and the system configuration information include information related to a communication method used by the wireless communication.

Accordingly, it is possible to switch the tactile data to be input to the tactile presentation units, according to the communication method of the wireless communication.

Hence, a tactile stimulus suitable for the communication method of the wireless communication can be provided from the tactile presentation units to the user.

In addition, in the control device as the embodiment, it is desirable that the system configuration information include information related to the numbers of pieces of the sound data and the tactile data that can be transmitted by the wireless communication.

Accordingly, it is possible to switch the tactile data to be input to the tactile presentation units, according to the numbers of pieces of sound data and tactile data.

Hence, a tactile stimulus suitable for the number of pieces of data that can be transmitted by the wireless communication can be provided from the tactile presentation units to the user.

In addition, in the control device as the embodiment, it is desirable that the content information include information related to data configurations of the sound data and the tactile data.

Accordingly, it is possible to switch the tactile data to be input to the tactile presentation units, according to the data configurations of the sound data and the tactile data. Hence, a tactile stimulus suitable for the data configurations of the sound data and the tactile data can be provided from the tactile presentation units to the user.

In addition, in the control device as the embodiment, it is desirable that, in a case where the content data does not include the tactile data, the switching control unit cause the tactile presentation units to provide a tactile stimulus on the basis of the tactile data generated by the tactile data generation unit.

Accordingly, it is possible to provide a tactile stimulus from the tactile presentation units on the basis of the tactile data generated by the tactile data generation unit even in the case where the content data does not include the tactile data.

Hence, even in the case where the content data includes no tactile data, a tactile stimulus suitable for the sound data can be provided from the tactile presentation units to the user.

In addition, in the control device as the embodiment, it is desirable that, in a case where the content data includes the tactile data, the switching control unit cause the tactile presentation units to provide a tactile stimulus on the basis of the tactile data included in the content data.

Accordingly, it is possible to provide a tactile stimulus from the tactile presentation units on the basis of the tactile data included in the content data in the case where the content data includes the tactile data.

Hence, in the case where the content data includes the tactile data, a tactile stimulus based on the tactile data reflecting an intention of a creator of the content can be provided to the user.

In addition, in the control device as the embodiment, it is desirable that, in the case where the content data includes the tactile data, the switching control unit do not cause the tactile data generation unit to generate the tactile data.

Accordingly, it is possible to reduce power consumption by not causing the tactile data generation unit to generate the tactile data in the case where the content data includes the tactile data.

Hence, for example, in a case where the aural-tactile presentation device is driven by a battery, a driving time of the aural-tactile presentation device can be made longer.

In addition, in the control device as the embodiment, it is desirable that regions to which a tactile stimulus is to be provided be associated with the tactile data, and in a case where the tactile data of regions corresponding to the tactile presentation units is included in the content data, the switching control unit cause the tactile presentation units to provide a tactile stimulus on the basis of the tactile data included in the content data.

Accordingly, it is possible to provide a tactile stimulus from the tactile presentation units on the basis of the tactile data of positions corresponding to the tactile presentation units.

Hence, an optimum tactile stimulus can be provided to an optimum region on the basis of the tactile data of the regions corresponding to the tactile presentation units.

In addition, in the control device as the embodiment, it is desirable that regions to which a tactile stimulus is to be provided be associated with the tactile data, and in a case where the tactile data of regions corresponding to the tactile presentation units is not included in the content data, the switching control unit cause the tactile presentation units to provide a tactile stimulus on the basis of the tactile data generated by the tactile data generation unit.

Accordingly, it is possible to prevent a tactile stimulus from being provided from the tactile presentation units on the basis of the tactile data of the regions that do not correspond to the tactile presentation units.

Hence, a tactile stimulus can be provided from the tactile presentation units to the user on the basis of not the tactile data of the regions that do not correspond to the tactile presentation units, but the tactile data generated by the tactile data generation unit. Therefore, it is possible to prevent a situation where an uncomfortable feeling is given to the user.

In addition, in the control device as the embodiment, it is desirable that regions to which a tactile stimulus is to be provided be associated with the tactile data, and in a case where the tactile data of a region other than regions corresponding to the tactile presentation units is included in the content data, the switching control unit cause the tactile presentation units to provide a tactile stimulus on the basis of the tactile data generated by the tactile data generation unit.

Accordingly, it is possible to prevent a tactile stimulus from being provided from the tactile presentation units on the basis of the tactile data of positions that do not correspond to the tactile presentation units.

Hence, a tactile stimulus can be provided from the tactile presentation units to the user on the basis of not the tactile data of the regions that do not correspond to the tactile presentation units, but the tactile data generated by the tactile data generation unit. Therefore, it is possible to prevent a situation where an uncomfortable feeling is given to the user.

In addition, a control method as an embodiment includes causing stereo speakers of an aural-tactile presentation device to output sound on the basis of sound data and causing tactile presentation units provided corresponding to the respective stereo speakers in the aural-tactile presentation device to provide a tactile stimulus on the basis of tactile data, and switching, on the basis of content information of content data including at least the sound data, the tactile data to be input to the tactile presentation units to either the tactile data generated by a tactile data generation unit on the basis of the sound data or the tactile data included in the content data.

Actions similar to those of the control device according to the present technique described above can be obtained even by such a control method.

It should be noted that effects described in the specification are merely examples and not limitative, and there may be other effects.

5. Present Technique

It should be noted that the present technique can also adopt the following configurations.

(1)

A control device including:

a reproduction unit that causes stereo speakers of an aural-tactile presentation device to output sound on the basis of sound data and causes tactile presentation units provided corresponding to the respective stereo speakers in the aural-tactile presentation device to provide a tactile stimulus on the basis of tactile data; and a switching control unit that switches, on the basis of content information of content data including at least the sound data, the tactile data to be input to the tactile presentation units to either the tactile data generated by a tactile data generation unit on the basis of the sound data or the tactile data included in the content data.

(2)
The control device according to (1) above,
in which the switching control unit performs switching on the basis of the content information and system configuration information of the aural-tactile presentation device.

(3)
The control device according to (2) above,
in which the sound data and the tactile data are transmitted by wireless communication in the aural-tactile presentation device, and
in which the system configuration information includes information related to a communication method used by the wireless communication.

(4)
The control device according to (3) above,
in which the system configuration information includes information related to numbers of pieces of the sound data and the tactile data that can be transmitted by the wireless communication.

(5)
The control device according to any of (1) to (4) above,
in which the content information includes information related to data configurations of the sound data and the tactile data.

(6)
The control device according to any of (1) to (5) above,
in which, in a case where the content data does not include the tactile data, the switching control unit causes the tactile presentation units to provide a tactile stimulus on the basis of the tactile data generated by the tactile data generation unit.

(7)
The control device according to any of (1) to (6) above,
in which, in a case where the content data includes the tactile data, the switching control unit causes the tactile presentation units to provide a tactile stimulus on the basis of the tactile data included in the content data.

(8)
The control device according to (7) above,
in which, in the case where the content data includes the tactile data, the switching control unit does not cause the tactile data generation unit to generate the tactile data.

(9)
The control device according to any of (1) to (8) above,
in which regions to which a tactile stimulus is to be provided are associated with the tactile data, and
in which, in a case where the tactile data of regions corresponding to the tactile presentation units is included in the content data, the switching control unit causes the tactile presentation units to provide a tactile stimulus on the basis of the tactile data included in the content data.

(10)
The control device according to any of (1) to (9) above,
in which regions to which a tactile stimulus is to be provided are associated with the tactile data, and
in which, in a case where the tactile data of regions corresponding to the tactile presentation units is not included in the content data, the switching control unit causes the tactile presentation units to provide a tactile stimulus on the basis of the tactile data generated by the tactile data generation unit.

(11)
The control device according to any of (1) to (10) above,
in which regions to which a tactile stimulus is to be provided are associated with the tactile data, and
in which, in a case where the tactile data of a region other than regions corresponding to the tactile presentation units is included in the content data, the switching control unit causes the tactile presentation units to provide a tactile stimulus on the basis of the tactile data generated by the tactile data generation unit.

(12)
A control method including:
causing stereo speakers of an aural-tactile presentation device to output sound on the basis of sound data and causing tactile presentation units provided corresponding to the respective stereo speakers in the aural-tactile presentation device to provide a tactile stimulus on the basis of tactile data; and
switching, on the basis of content information of content data including at least the sound data, the tactile data to be input to the tactile presentation units to either the tactile data generated by a tactile data generation unit on the basis of the sound data or the tactile data included in the content data.

REFERENCE SIGNS LIST

1: Content reproduction system
2: Video reproduction device
3: Aural-tactile presentation device
10: Television device
11: Wireless communication device
16: Control unit
21: Speaker
22: Tactile presentation unit
23: Wireless communication unit
24: Control unit
25: Tactile data generation unit
26: Switch unit
30: Content selection unit
31: Reproduction mode decision unit
32: Reproduction mode setting unit
33: Content reproduction unit
40: System configuration information transmission unit
41: Reproduction mode switching unit
42: Content reproduction unit
100: Content reproduction system
102: Video reproduction device
103: Aural-tactile presentation device
110: Television device
111: Wired communication device
116: Control unit
123: Wired communication unit
124: Control unit
131: Reproduction mode decision unit

The invention claimed is:
1. A control device, comprising:
a reproduction unit configured to control:
a plurality of speakers of an aural-tactile presentation device to output sound based on sound data; and
a plurality of tactile presentation units of the aural-tactile presentation device to provide a tactile stimulus based on a tactile data, wherein
a tactile presentation unit of the plurality of tactile presentation units corresponds to a speaker of the plurality of speakers in the aural-tactile presentation device, and a plurality of first regions where the tactile stimulus is provided is associated with the tactile data; and a switching control unit configured to:
control a tactile data generation unit to generate the tactile data, wherein the generation of the tactile data is based on the sound data; and
switch, based on content information of content data including at least the sound data, the tactile data input to the plurality of tactile presentation units to one of
the tactile data generated by the tactile data generation unit, or the tactile data included in the content data,
wherein in a case where the content data includes the tactile data of the plurality of first regions corresponding to the plurality of tactile presentation units, the switching control unit is further configured to control the plurality of tactile presentation units to provide the tactile stimulus based on the tactile data included in the content data.

2. The control device according to claim 1, wherein the switching control unit is further configured to perform the switch based on each of the content information and system configuration information of the aural-tactile presentation device.

3. The control device according to claim 2, wherein
the aural-tactile presentation device receives, by wireless communication, the sound data and the tactile data, and
the system configuration information includes information related to a communication method used by for the wireless communication.

4. The control device according to claim 3, wherein the system configuration information further includes information related to a number of pieces of the sound data transmitted by the wireless communication and a number of pieces of the tactile data transmitted by the wireless communication.

5. The control device according to claim 1, wherein the content information further includes information related to data configurations of the sound data and the tactile data.

6. The control device according to claim 1, wherein,
in a case where the content data does not include the tactile data, the switching control unit is further configured to control the plurality of tactile presentation units to provide the tactile stimulus based on the tactile data generated by the tactile data generation unit.

7. The control device according to claim 1, wherein, in the case where the content data includes the tactile data, the switching control unit does not control the tactile data generation unit to generate the tactile data.

8. The control device according to claim 1, wherein
in a case where the tactile data of the plurality of first regions corresponding to the plurality of tactile presentation units is not included in the content data, the switching control unit is further configured to control causes the plurality of tactile presentation units to provide the tactile stimulus based on the tactile data generated by the tactile data generation unit.

9. The control device according to claim 1, wherein
in a case where the tactile data of a second region different from the plurality of first regions corresponding to the plurality of tactile presentation units is included in the content data, the switching control unit is further configured to control the plurality of tactile presentation units to provide the tactile stimulus based on the tactile data generated by the tactile data generation unit.

10. A control method, comprising:
outputting, by a plurality of speakers of an aural-tactile presentation device, te output sound based on sound data;
outputting, by a plurality of tactile presentation units of the aural-tactile presentation device, a tactile stimulus based on tactile data, wherein
a tactile presentation unit of the plurality of tactile presentation units corresponds to a speaker of the plurality of speakers in the aural-tactile presentation device, and
a plurality of regions where the tactile stimulus is provided is associated with the tactile data;
generating, by a tactile data generation unit, tactile data based on the sound data;
switching, by a switching control unit, based on content information of content data including at least the sound data, the tactile data input to the plurality of tactile presentation units to one of
the tactile data generated by the tactile data generation unit, or
the tactile data included in the content data; and
in a case where the content data includes the tactile data of the plurality of regions corresponding to the plurality of tactile presentation units, controlling, by the switching control unit, the plurality of tactile presentation units to provide the tactile stimulus based on the tactile data included in the content data.

* * * * *